(12) United States Patent
Gianakopoulos et al.

(10) Patent No.: US 11,904,812 B2
(45) Date of Patent: Feb. 20, 2024

(54) PASSENGER VEHICLE PERSONAL ELECTRONIC DEVICE HOLDERS

(71) Applicant: REINHOLD INDUSTRIES, INC., Santa Fe Springs, CA (US)

(72) Inventors: Kosta Gianakopoulos, Highland Village, TX (US); Clarence Hightower, La Mirada, CA (US)

(73) Assignee: REINHOLD INDUSTRIES, INC., Santa Fe Springs, CA (US)

( * ) Notice: Subject to any disclaimer, the term of this patent is extended or adjusted under 35 U.S.C. 154(b) by 376 days.

(21) Appl. No.: 17/116,309

(22) Filed: Dec. 9, 2020

(65) Prior Publication Data

US 2021/0178977 A1    Jun. 17, 2021

Related U.S. Application Data

(60) Provisional application No. 62/947,069, filed on Dec. 12, 2019.

(51) Int. Cl.
| | | |
|---|---|---|
| *B60R 7/04* | (2006.01) | |
| *B60R 11/00* | (2006.01) | |
| *B64D 11/00* | (2006.01) | |
| *B60R 7/08* | (2006.01) | |

(52) U.S. Cl.
CPC ............... *B60R 7/08* (2013.01); *B60R 7/043* (2013.01); *B60R 11/00* (2013.01); *B60R 2011/0012* (2013.01); *B60R 2011/0082* (2013.01); *B64D 11/00153* (2014.12)

(58) Field of Classification Search
CPC .......... B64D 11/00153; B64D 11/0015; B60R 7/043; B60R 2011/0082; B60R 11/0241; B60R 11/0252

USPC ...... 224/929; D14/251, 253, 447; 297/188.6
See application file for complete search history.

(56) References Cited

U.S. PATENT DOCUMENTS

| | | |
|---|---|---|
| 5,000,511 A | 3/1991 | Shichijo et al. |
| 5,177,616 A | 1/1993 | Riday |
| 5,179,447 A | 1/1993 | Lain |
| 5,195,709 A | 3/1993 | Yasushi |
| 5,311,302 A | 5/1994 | Berry et al. |
| 5,374,104 A | 12/1994 | Moore et al. |
| 5,667,179 A | 9/1997 | Rosen |
| 5,709,360 A | 1/1998 | Rosen |
| 5,996,954 A * | 12/1999 | Rosen ................ B60R 11/0235 248/278.1 |
| 6,007,036 A | 12/1999 | Rosen |
| 6,179,263 B1 | 1/2001 | Rosen et al. |
| 6,305,973 B1 | 10/2001 | Rosen |
| 6,863,344 B2 | 3/2005 | Smallhorn |
| D520,017 S * | 5/2006 | van Kuijk .................... D14/452 |
| 7,261,266 B2 | 8/2007 | Satterfield |
| D639,815 S * | 6/2011 | Lye .............................. D14/447 |
| 8,056,871 B2 * | 11/2011 | Matias ................... F16M 11/10 248/176.1 |

(Continued)

FOREIGN PATENT DOCUMENTS

EP          2547584 B1     5/2017

*Primary Examiner* — Justin M Larson
(74) *Attorney, Agent, or Firm* — Hahn Loeser & Parks LLP

(57) ABSTRACT

This disclosure relates generally to personal electronic device holders. More specifically, the present disclosure relates to phone and tablet holders for use with passenger seating for passenger vehicles, such as a passenger aircraft.

16 Claims, 26 Drawing Sheets

(56) References Cited

U.S. PATENT DOCUMENTS

| | | | |
|---|---|---|---|
| 8,439,238 B1 * | 5/2013 | Harter | B60R 11/02 224/544 |
| 8,469,323 B1 * | 6/2013 | Deros | F16M 11/105 248/124.2 |
| D689,045 S * | 9/2013 | Mardas | D14/253 |
| D689,502 S * | 9/2013 | Belitz | D14/447 |
| 8,523,130 B2 | 9/2013 | Westerink | |
| 8,534,521 B2 * | 9/2013 | Nakajima | B62J 50/225 224/547 |
| 8,704,960 B2 | 4/2014 | Weaver | |
| 8,789,733 B2 * | 7/2014 | Zhang | F16M 13/02 224/929 |
| D717,804 S * | 11/2014 | Budge | D14/447 |
| 8,885,338 B1 * | 11/2014 | Simpson | A45F 5/10 224/929 |
| D754,136 S * | 4/2016 | Schoening | D14/447 |
| 9,573,686 B2 | 2/2017 | Barth | |
| 9,617,001 B2 | 4/2017 | Zimmermann | |
| 9,732,901 B2 | 8/2017 | Satterfield | |
| 9,989,191 B2 | 6/2018 | Parker et al. | |
| 10,343,778 B2 | 7/2019 | Peuziat | |
| D856,321 S * | 8/2019 | Khalsa | D14/447 |
| 10,569,878 B2 * | 2/2020 | Satterfield | B60N 2/79 |
| D902,195 S * | 11/2020 | Ko | D16/244 |
| D920,338 S * | 5/2021 | Chen | D14/447 |
| D923,631 S * | 6/2021 | Chen | D14/447 |
| 11,109,741 B1 * | 9/2021 | Ubbesen | G06F 1/1607 |
| D938,433 S * | 12/2021 | Huang | D14/447 |
| D942,463 S * | 2/2022 | Li | D14/447 |
| D944,809 S * | 3/2022 | Wang | D14/447 |
| D959,440 S * | 8/2022 | Jia | D14/447 |
| D960,167 S * | 8/2022 | Ubbesen | D24/186 |
| D965,601 S * | 10/2022 | Chen | D14/447 |
| D965,602 S * | 10/2022 | Hu | D14/447 |
| D968,326 S * | 11/2022 | Luo | D14/447 |
| D979,574 S * | 2/2023 | Zhang | D14/447 |
| 2004/0182897 A1 * | 9/2004 | Andrews | B60N 3/005 224/483 |
| 2008/0296449 A1 * | 12/2008 | Carnevali | B60R 11/02 248/205.1 |
| 2015/0048230 A1 * | 2/2015 | Satterfield | F16M 11/2064 248/278.1 |
| 2015/0274296 A1 | 10/2015 | Zimmerman | |
| 2017/0021928 A1 | 1/2017 | Satterfield | |
| 2021/0178977 A1 * | 6/2021 | Gianakopoulos | B60R 11/0241 |

\* cited by examiner

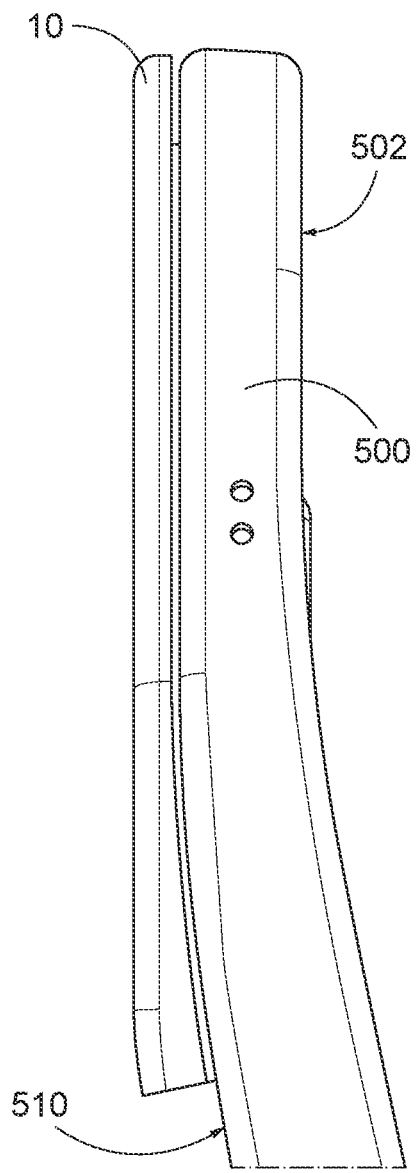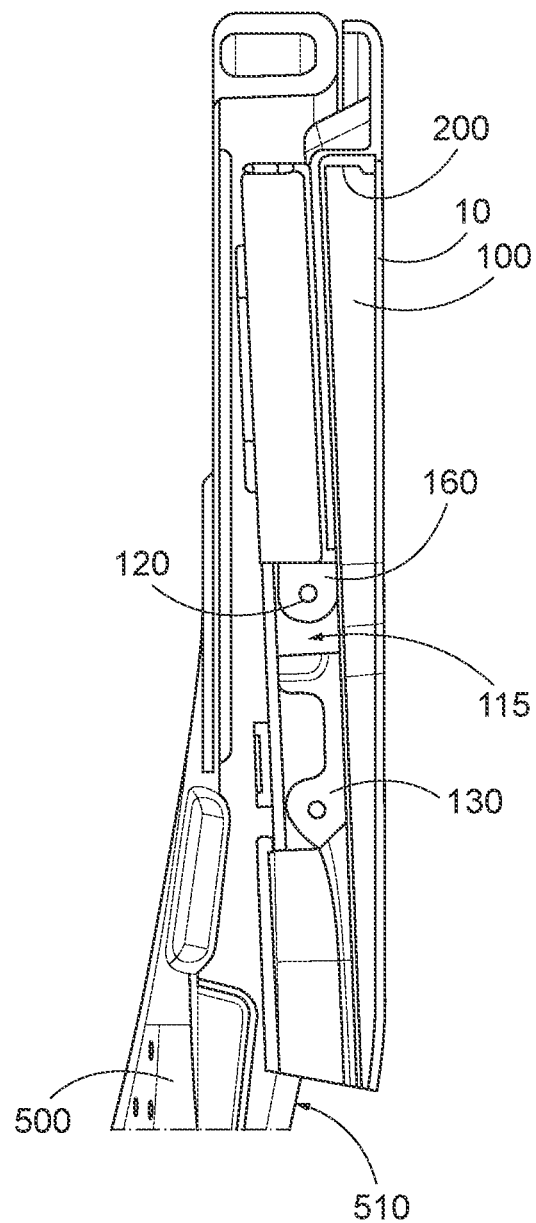
FIG. 17
FIG. 18

PASSENGER VEHICLE PERSONAL ELECTRONIC DEVICE HOLDERS

This patent application claims priority to and benefit of U.S. Provisional Application No. 62/947,069, filed Dec. 12, 2019, which is incorporated herein by reference.

TECHNICAL FIELD

This disclosure relates generally to personal electronic device holders. More specifically, the present disclosure relates to phone and tablet holders for use with passenger seating for passenger vehicles, such as a passenger aircraft.

BACKGROUND

Passenger vehicles relied on for mass transportation, such as buses, trains, aircraft, or the like, provide a service for moving passengers from one location to the next. Demand for passenger accommodations and comfort is increasing. To accommodate passenger comfort, complexities have been introduced to passenger seating arrangements. By example, in flight entertainment (IFE) systems and the like have long been provided. These entertainment systems, however, require significant space and components. The entertainment systems are also integral with the vehicle and/or the seating arrangements. This is space that could otherwise be utilized for seating. These systems also add unnecessary weight and complexity to the passenger vehicle, such as an aircraft.

With new technologies for personal electronic devices, such as personal tablets and smart phones, passengers essentially travel with their own entertainment systems. Passenger vehicles, however, have not been built or modified to accommodate such personal entertainment systems. Instead, passengers must hold the entertainment systems while in use. This prevents a passenger from also enjoying in-flight meals, beverages, and/or other interactions. Additionally, this prevents passengers from multi-tasking while also enjoying their personal entertainment systems.

What is needed is a passenger vehicle personal device holder which maintains a passenger's personal electronic device in a hands-free arrangement. More specifically, what is needed is a passenger vehicle personal device holder that is secured to, and even retrofitted with, an existing passenger seating arrangement and that is made to support and accommodate personal electronic devices in a hands-free arrangement. What is needed is a passenger vehicle personal device holder that is supported from the very seat the passenger using the personal electronic device is seated and which may, otherwise, be concealed when not in use. What is needed is a passenger vehicle personal device holder that is supported on the backside of the passenger seat.

SUMMARY

The present disclosure relates generally to personal electronic device holders. More specifically, the present disclosure relates to phone and tablet holders for use with passenger seating for passenger vehicles, such as a passenger aircraft.

A personal electronic device holder for a passenger vehicle of the present disclosure comprises a device holder and an articulating arm. The device holder is secured to a first end of the articulating arm wherein a second end of the articulating arm is secured to a passenger vehicle seat assembly. The second end of the articulating arm is secured to a passenger vehicle seat assembly by a mounting bracket. The articulating arm may further comprise an extension arm. The extension arm is attached to the mounting bracket at a hinge assembly and is attached to the device holder with one or more joints. The articulating arm moves the personal device holder between an extended position and a stowed position. The device holder further comprises a support surface and a bottom ledge for supporting a removable personal electronic device for use from the passenger vehicle seat assembly the articulating arm is secured to. The support surface may further comprise a grip aperture for securing a backside grip extending from a personal electronic device. In some examples the grip aperture may narrow from a top side of the support surface in a direction toward the bottom ledge. In some examples the aperture narrows laterally across the support surface. In some examples the extension arm may comprise one or more cable apertures. The cable apertures extend through a width of the extension arm. In some examples the extension arm may comprise a scalloped profile on one or more sidewalls of the extension arm. In some examples the extension arm may comprise both the cable apertures and the scalloped profile. In some examples the one or more cable apertures are open through a sidewall different than the one or more sidewalls having a scalloped profile. In operation, the stowed position may be below a passenger vehicle seat of the passenger vehicle seat assembly. In other examples the stowed position may be below a passenger vehicle armrest of a passenger vehicle seat assembly. In some examples, the hinge assembly may comprise a passenger activated latch for releasing the articulating arm from a locked position.

In some examples the personal electronic device holder may comprise a clamp assembly. The clamp assembly may comprise a small personal device clamp and a large personal device clamp. The small personal device clamp and the large personal device clamp may be positioned within a void in the support surface. The small personal device clamp may comprise a spring loaded hinge assembly and may extend from the support surface. The small personal device clamp may retract to the support surface when the large device clamp is in use.

In some examples the personal electronic device holder may further comprise a slide assembly and a compression assembly. The slide assembly and the compression assembly adjust to the size of a personal electronic device by moving the clamp assembly relative the support surface. In some examples, the slide assembly and the compression assembly secure the personal electronic device between the clamp assembly and the bottom edge.

Some examples of the personal electronic device holder for a passenger vehicle may be for use in a backside of a passenger seat assembly. The personal electronic device holder may be positioned within a backside of a passenger seat assembly where the device holder comprises a support surface, a top retention tab, and a clamp assembly. The clamp assembly may be positioned within a void of the support surface. The clamp assembly may comprise a small personal device clamp and a large personal device clamp. The clamp assembly may further comprise a slide assembly and a compression assembly. The slide assembly and the compression assembly may secure a personal electronic device between the clamp assembly and the top retention tab. The slide assembly and the compression assembly may adjust to the size of a personal electronic device by moving the clamp assembly relative the support surface. In each of the examples above, a wireless charger powered by a power supply of the passenger seat assembly may be secured within the slide assembly and moves with the clamp assembly on the slide assembly to maintain the wireless charger in a charging position relative to a personal electronic device.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which:

FIG. 17 is a side view of a passenger vehicle seatback having a personal electronic device holder, in accordance with an example of the disclosure.

FIG. 18 is a cross-section of a passenger vehicle seatback having a personal electronic device holder taken at line 18-18 of FIG. 15, in accordance with an example of the disclosure.

DETAILED DESCRIPTION

Figure 1:
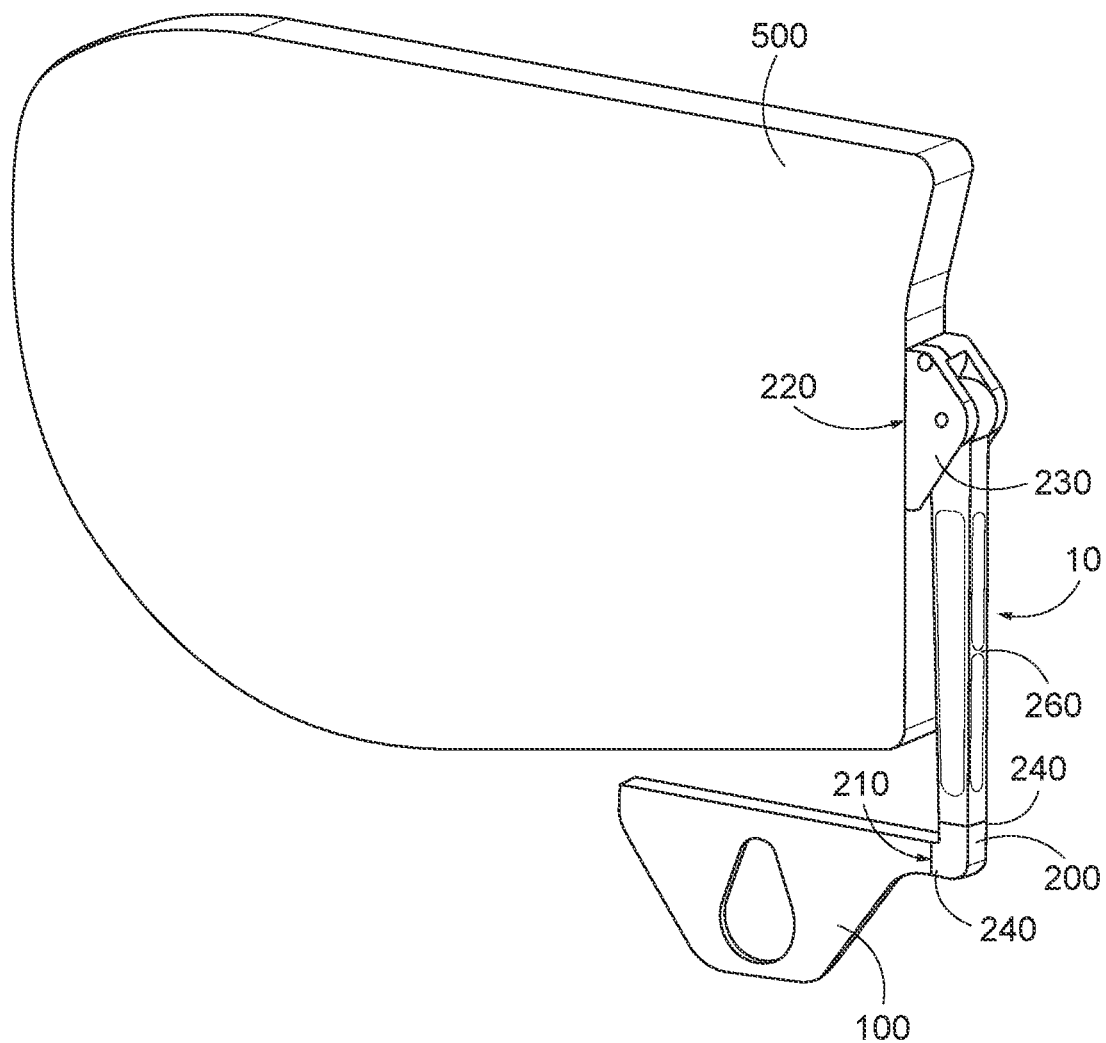
FIG. 1 is a perspective view of a personal electronic device holder with an articulating arm in a stowed position, in accordance with an example of the disclosure.

Referring to FIG. 1, an example of a personal electronic device holder 10 for a passenger vehicle is illustrated. The personal electronic device holder 10 is illustrated in a stowed position. A device platform 100 of personal electronic device holder 10 is attached to a first end 210 of an articulating arm 200. The second end 220 of the articulating arm 200 is secured to a passenger vehicle seating structure or work station. In the present example, the second end 220 of the articulating arm 200 is secured to an in-arm table structure (IAT) 500 that may otherwise be a workstation for a passenger of the passenger vehicle. The IAT 500 may be positioned between adjoining passenger seats of a passenger vehicle. The IAT 500 may additionally, or alternatively, be positioned to an open end of a passenger seat at the end of a seating row. In other examples, the articulating arm may be secured to the seat framing, an existing in-flight entertainment system (IFE), and/or the floor of the passenger vehicle.

When in the stowed position, the personal electronic device holder 10 may be articulated, such that it is rotated and manipulated, by way of the articulating arm 200 to be positioned below the IAT, beneath a passenger seat, beneath an armrest, and/or between a passenger seat such as, for example, out of the way of the passengers of the passenger vehicle and/or the aisle of the passenger vehicle. This is illustrated by FIG. 1, relative the IAT 500. The articulating arm 200 may be rotatable at a mounting bracket 230 that is secured to the IAT 500. The articulating arm 200 moves relative to the IAT 500. Additionally, the articulating arm 200 may further comprise joints 240 that rotate and/or manipulate into a variety of positions. Examples of such joints may include operation by way of Reell friction hinges.

Figure 2:
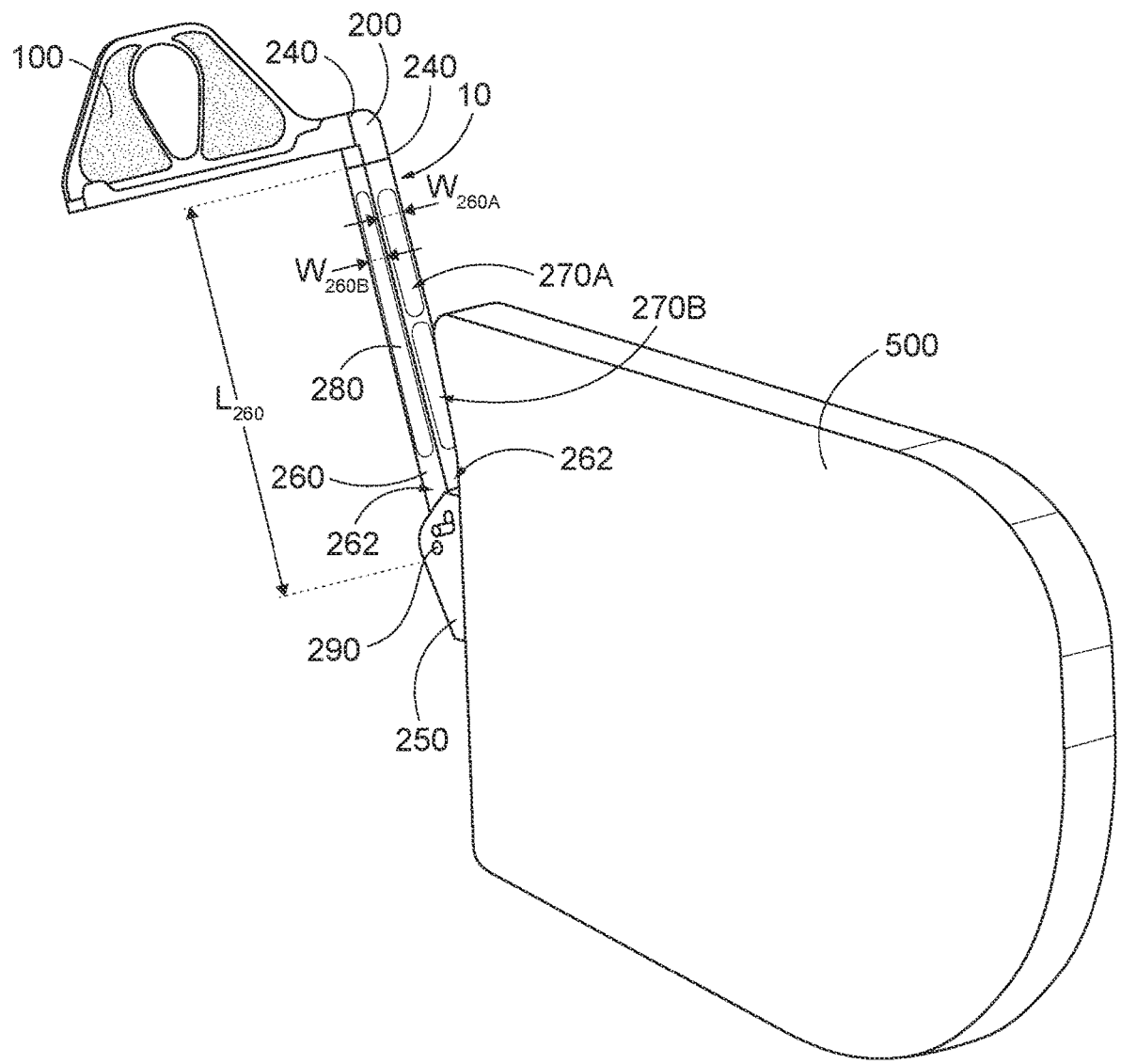
FIG. 2 is a perspective view of a personal electronic device holder with an articulating arm in a raised position, in accordance with an example of the disclosure.

Turning to FIG. 2, the personal electronic device holder 10 of FIG. 1 is illustrated in a raised position. When in the raised position, the articulating arm 200 of the personal electronic device holder 10 is elevated where the device platform 100 is positioned into a usable position relative the passenger of the passenger vehicle. By example and as illustrated by FIGS. 1-2, the articulating arm 200 may be rotated upwards at a hinge assembly 290 between a mounting bracket 250 and an extension arm 260 of the articulating arm 200. The position of the personal electronic device holder 10 may be further adjusted, or manipulated, at each joint 240 where the joint maintains the personal electronic device holder 10 in position. The mounting bracket 250 may be rigidly secured to the passenger vehicle, passenger seat, and/or an IAT 500, as illustrated in FIGS. 1-2.

Referring to FIG. 2, the articulating arm 200 comprises one or more cable apertures 270A, 270B. In FIG. 2, two cable apertures 270A, 270B extend through a width $W_{260}$ of the extension arm 260 of the articulating arm 200. The two cable apertures 270A, 270B are adjacent one another the length $L_{260}$ of the extension arm 260. In some examples, the cable apertures may extend through alternating widths $W_{260A}$, $W_{260B}$ of the extension arm 260. The cable apertures 270A, 270B are provided as a pathway for wrapping a device cable in through the articulating arm 200 to secure and support the device cable. The device cable may be a power cord, communication cable, audio/video cable, or the like. By wrapping the device cable in through the articulating arm 200 the device cable is secured and supported away from the aisle, other passengers, and work spaces. The device cable may travel the articulating arm 200 from a personal electronic device, supported by the device platform, down to the passenger, the seat structure, an audio/video connection, and/or power source positioned on, at, or near the seat structure. The cable apertures 270A, 270B extend through a width $W_{260}$ of the extension arm 260 and open through a sidewall 262 of the extension arm 260. Thereby, the device cable may wrap in through the cable apertures 270A, 270B and about the exterior of the articulating arm 200 where they remain accessible. More specifically, the device cable remains accessible for subsequent removal with the personal electronic device which may be removed by the passenger when the passenger exits the passenger vehicle so to provide accessibility for insertion of a subsequent device cable by the subsequent passenger upon entering the passenger vehicle.

Still referring to FIGS. 1-2, the articulating arm 200 also comprises one or more scalloped profiles 280. In FIGS. 1-2, the scalloped profiles 280 are recesses provided in a sidewall 262 of the extension arm 260. The scalloped profiles 280 are a gripping structure for gripping and operating the articulating arm 200. Specifically, a passenger may grip the scalloped profiles 280 and maneuver the articulating arm 200 from a stowed positioned to a raised position and vice versa. Because the joints 240 of the articulating arm 200 are intended to operably secure the personal electronic device holder 10 in desired positions, while additionally maintaining a degree of pivoting and rotating between positions, the articulating arm 200 must be forcibly moved between the positions. Therefore, the aforementioned scalloped profiles 280 are provided to assist with gripping the articulating arm in order to impart movement on the articulating arm 200. In some examples, the scalloped profiles may be on alternate sides of the articulating arm from the cable apertures along the length $L_{260}$ of the extension arm 260. Additionally, the cable apertures 270A, 270B and the scalloped profiles 280 reduce the weight of the personal electronic device holder 10, such as in aircraft conditions where reduced weight is desired for reducing fuel consumption as well as increasing passenger or cargo capacity.

Figure 3:
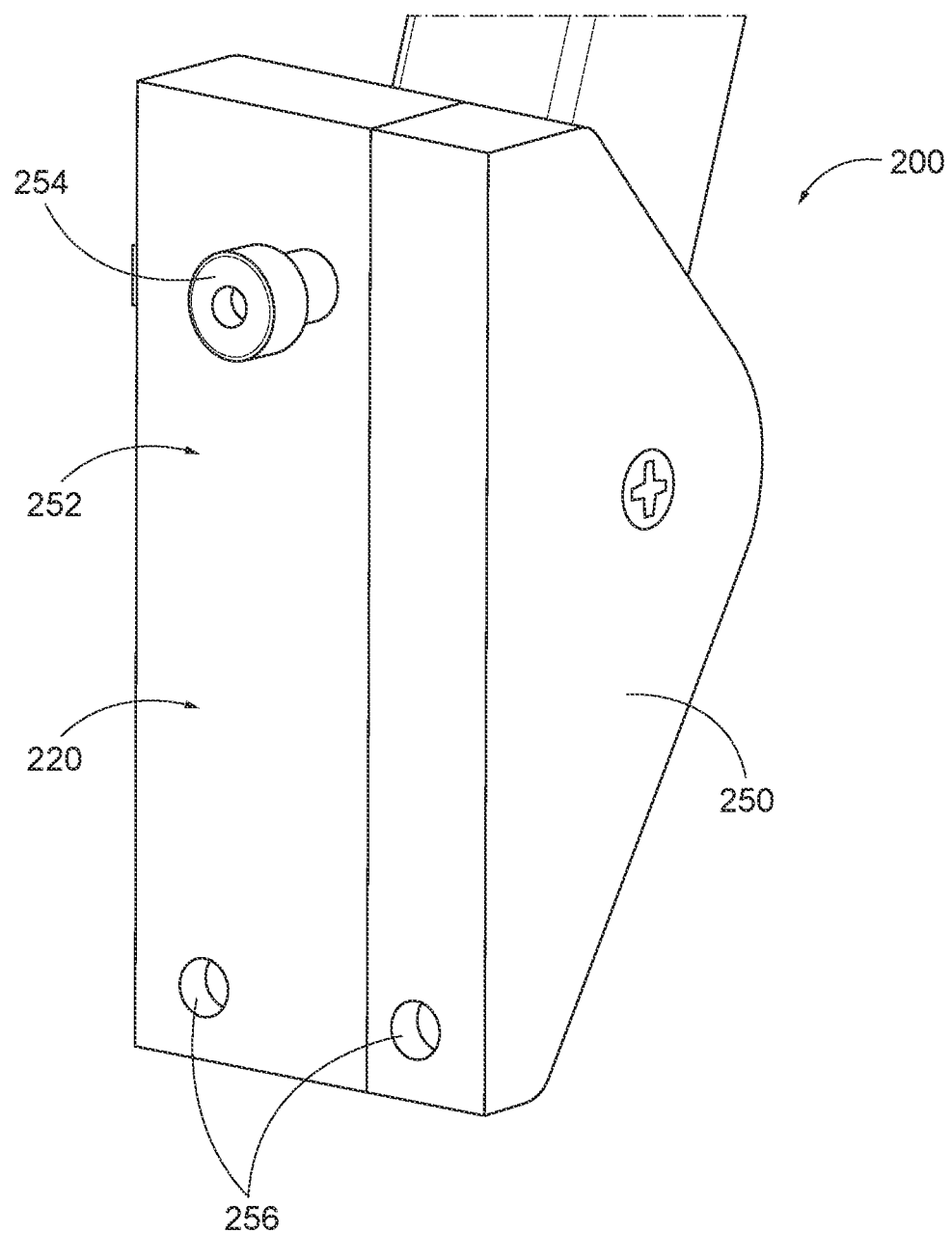
FIG. 3 is a rear perspective view of a mounting bracket for a personal electronic device holder with an articulating arm in a raised position, in accordance with an example of the disclosure.

Turning to FIG. 3, a mounting bracket 250 at the second end 220 of the articulating arm 200 is illustrated. The mounting bracket 250 may be designed to affix to an existing IAT, a seat frame, an existing in-flight entertainment system (IFE), and/or even the floor of the passenger vehicle. In the example of FIG. 3, the back side 252 mounting bracket 250 comprises an adjustable locking pin 254 for positioning the mounting bracket 250 in an aperture of the adjoining structure. Additional fastener thru-holes 256 are provided for securing the mounting bracket to a face of the adjoining structure. Any fastener known in the art may be used such as, for example, screws, rivets, bolts, adhesive, a combination thereof, or the like. The mounting bracket 250 supports the articulating arm 200 once secured to the adjoining structure.

Figure 4:
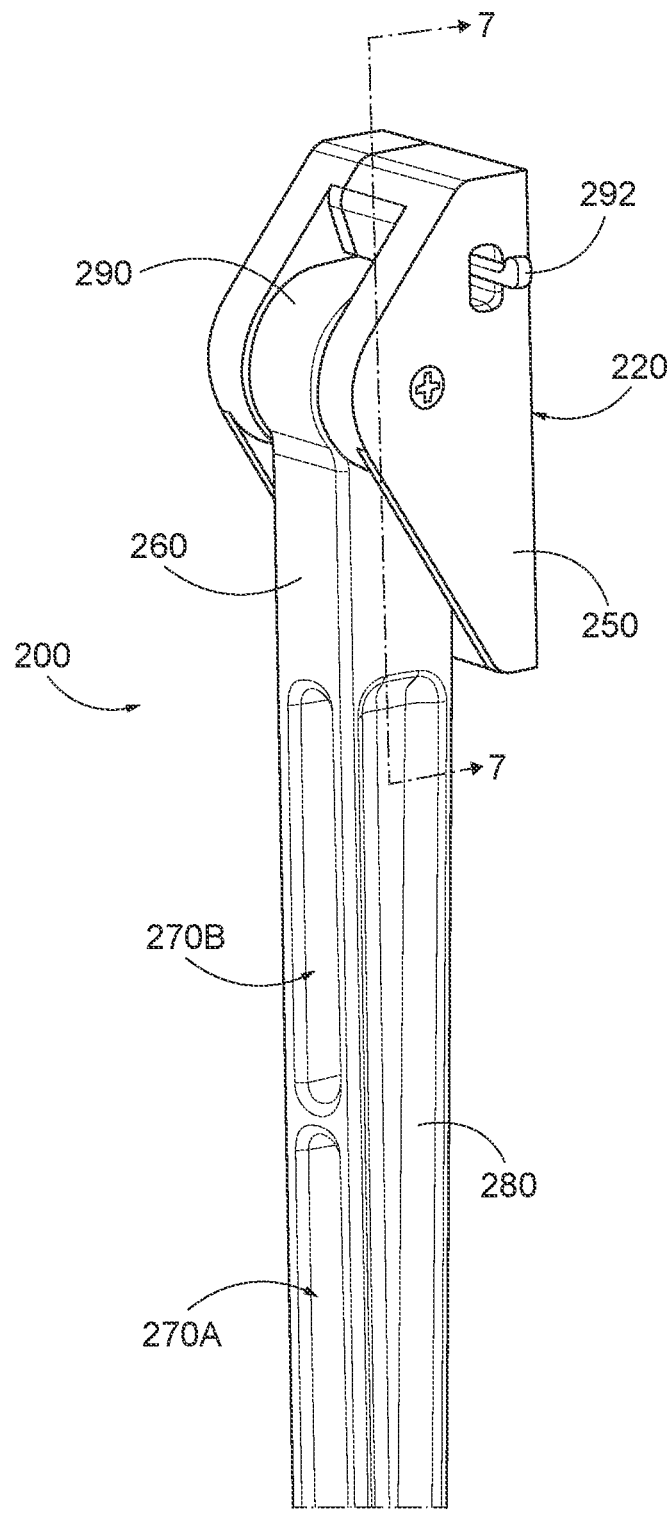
FIG. 4 is a front perspective view of an articulating arm and a mounting bracket for a personal electronic device holder in a stowed position, in accordance with an example of the disclosure.

FIG. 4 illustrates a front view of the second end 220 of the articulating arm 200, including the mounting bracket 250. Also illustrated by FIG. 4 are the scalloped profiles 280 and the cable apertures 270A, 270B in the extension arm 260 of the articulating arm 200. In FIG. 4, the mounting bracket 250 is secured to the extension arm 260 at a hinge assembly 290. The articulating arm 200 pivots from the stowed position to a raised position, and vice versa, about the hinge assembly 290. The articulating arm 200 may be locked in a stowed position and/or a raised position by way of a passenger activated latch 292.

Figure 5:
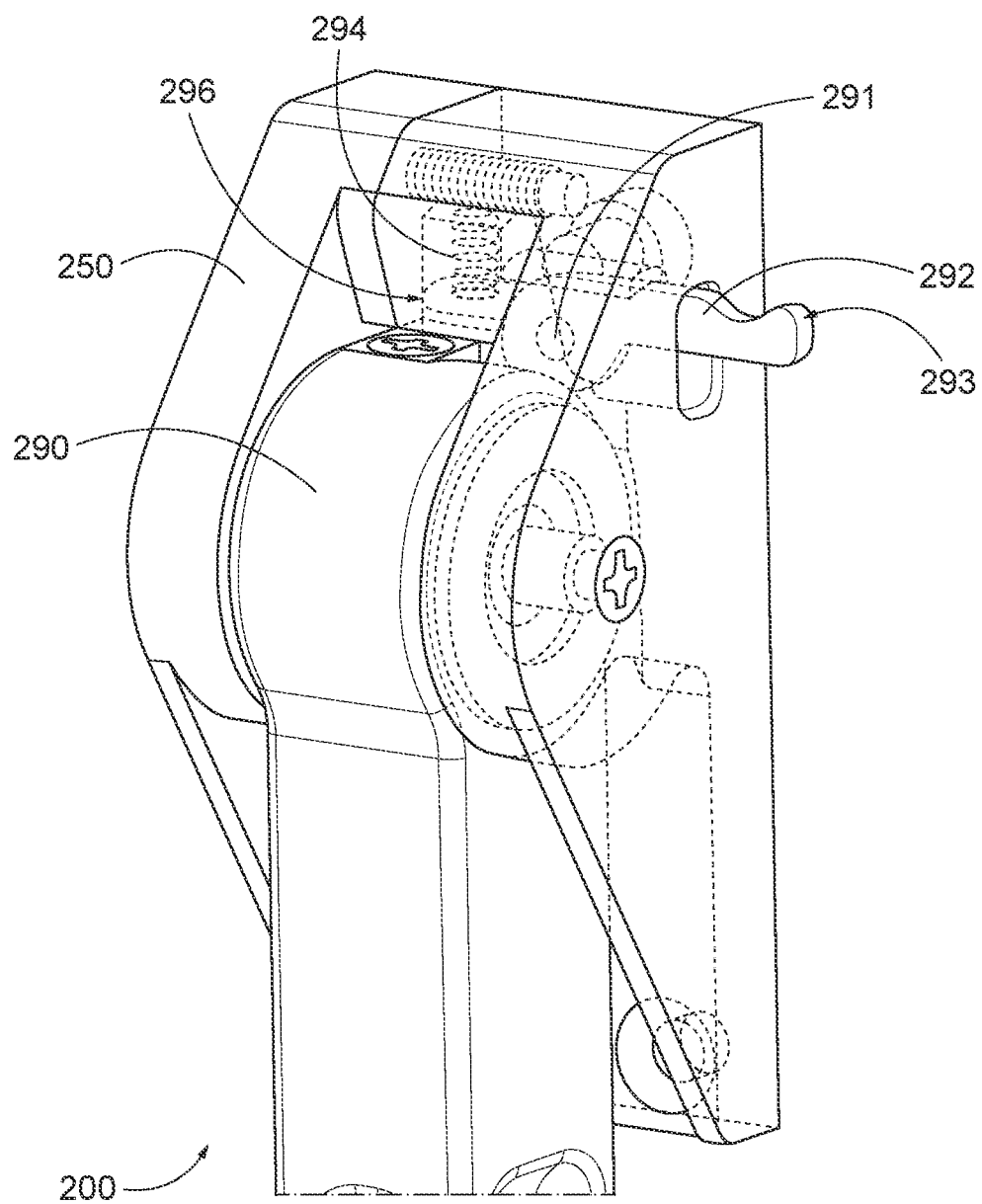
FIG. 5 is a front perspective view a mounting bracket for a personal electronic device holder with an articulating arm in a stowed position, in accordance with an example of the disclosure.
Figure 6:
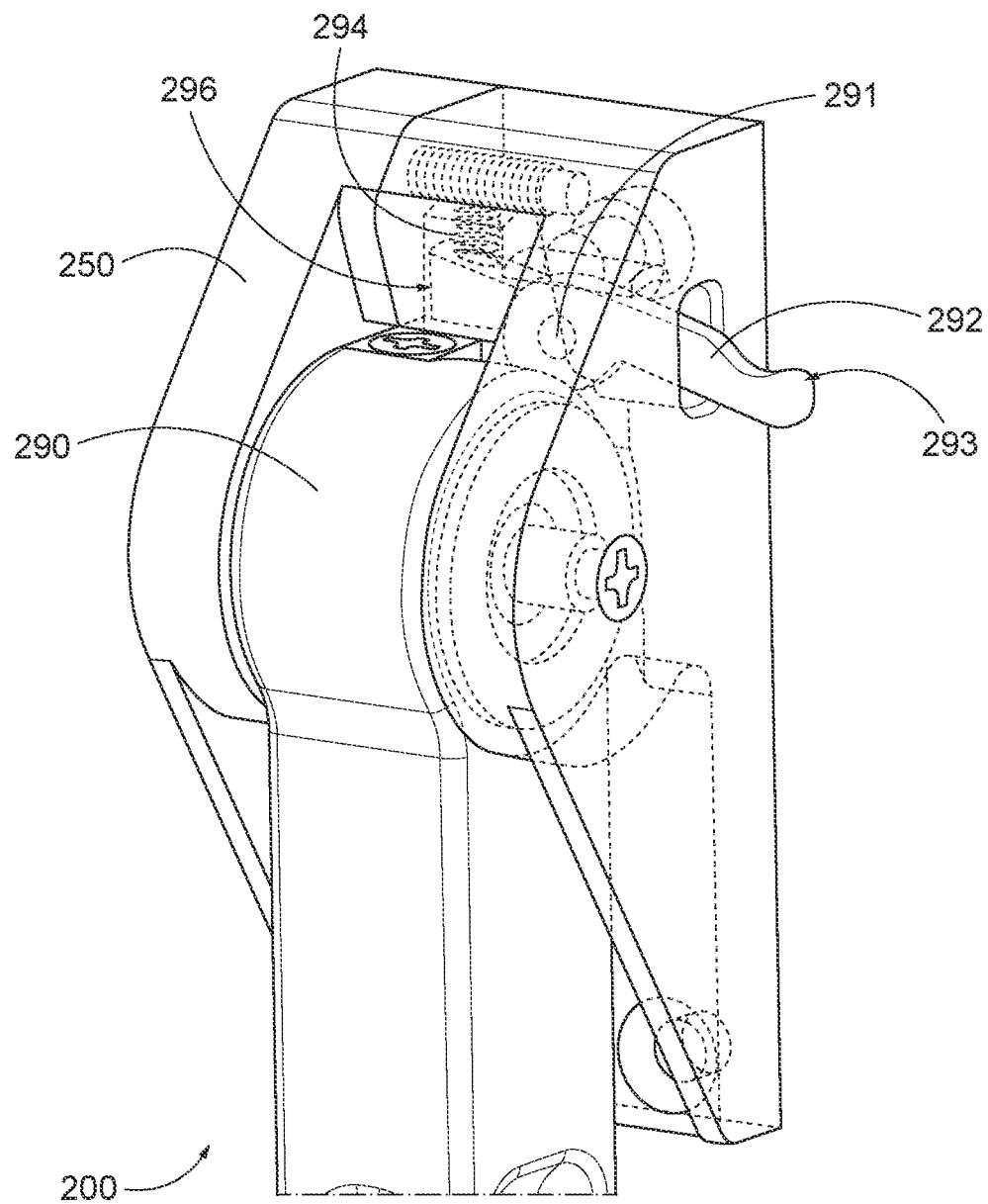
FIG. 6 is a front perspective view of a mounting bracket for a personal electronic device holder with an articulating arm being released from a stowed position, in accordance with an example of the disclosure.

The hinge assembly 290 and passenger activated latch 292 are best illustrated by FIGS. 5-6, with one side of the mounting bracket 250 transparent to illustrate the internal components. In FIG. 5, the passenger activated latch 292 is in a locked engagement where the articulating arm 200 is secured in a stowed position. This safely maintains the articulating arm in the stowed position to prevent unwanted movement of the articulating arm 200, such as when an aircraft may be encountering turbulence and/or during take-off or landing. The passenger activated latch 292 may additionally lock the articulating arm 200 in the raise position and one or more intermediate positions between the stowed and raised positions. In FIG. 5, the passenger activated latch 292 is in locked engagement. A compression spring 294 forcibly maintains the passenger activated latch 292 in the locked engagement except for upon intervention by the passenger. To maintain the passenger activated latch 292 in the locked engagement the compression spring 294 forces the engaging end 296 of the passenger activated latch 292 against a stop 298 positioned on the hinge assembly 290. The stop 298 may additionally, or alternatively, be a recess formed in the hinge assembly 290. One or more stops 298 may be provided about the hinge assembly 290 providing one or more engaging positions that the passenger activated latch 292 may maintain the articulating arm 200 in. Opposite the engaging end 296 of the passenger activated latch 292 is an operating end 293 which a passenger may engage for releasing the passenger activated latch 292 and imparting movement to the articulating arm 200. As illustrated by FIG. 6, a passenger may simply push on the operating end 293 of the passenger activated latch 292. By pushing on the operating end 293, the passenger activated latch 292 may pivot about a latch pivot position 291 and applying a compression force to the compression spring 294, thereby moving the engaging end 296. The engaging end 296 may be removed from the stop 298, thereby, allowing the articulating arm 200 to rotate about the hinge assembly 290. The compression spring 294 may force the engaging end 296 against a stop 298 as soon as force is no longer applied to the operating end 293 and, thereby, lock the articulating arm 200 at the hinge assembly 290.

Figure 7:
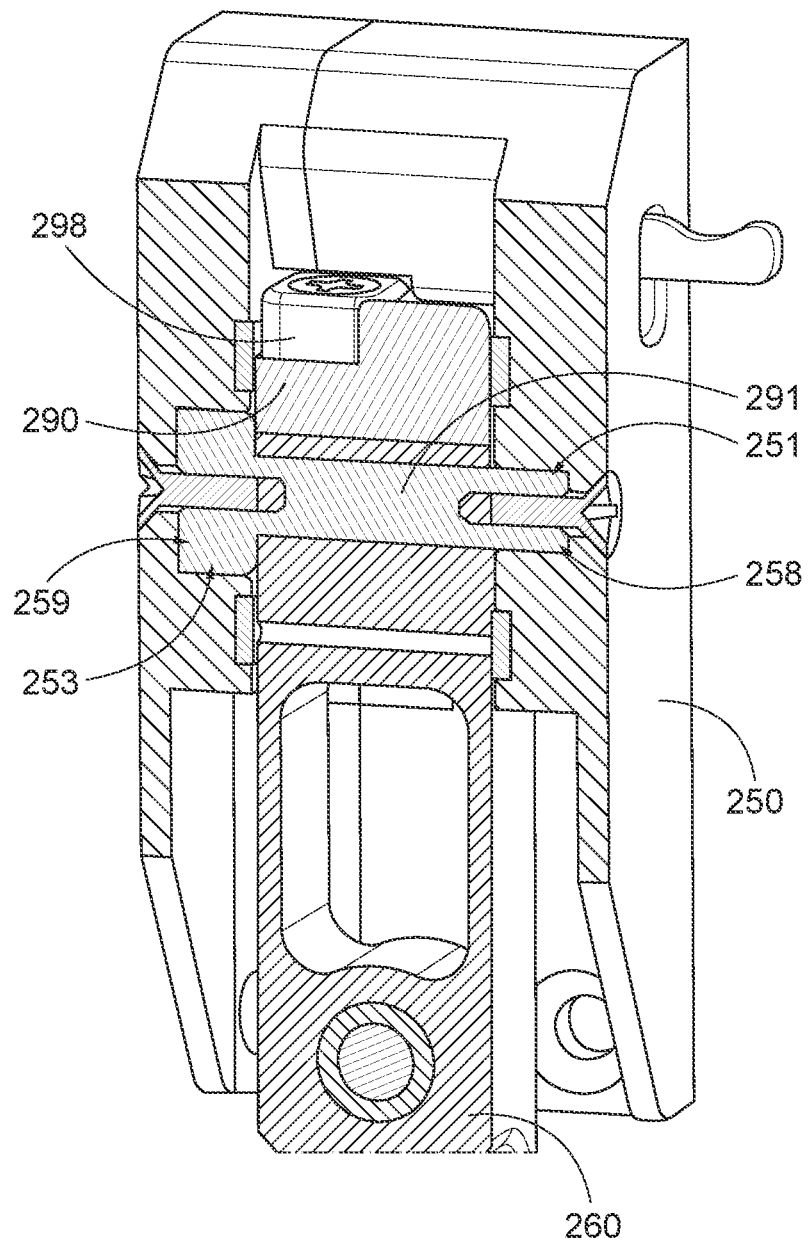
FIG. 7 is a cross-section of a mounting bracket for a personal electronic device holder with an articulating arm in a stowed position taken at line 7-7 of FIG. 4, in accordance with an example of the disclosure.

FIG. 7 is a vertical cross section through the extension arm 260 and the mounting bracket 250 at line 7-7 of FIG. 4. The hinge assembly 290 comprises an axle 291 secured to the mounting bracket 250 at two opposing ends 258, 259. Either the axle 291 rotates within the mounting bracket 250 and/or the extension arm 260 rotates about the axle 291, which may be rigidly affixed to the mounting bracket 250. The axle 291 may be keyed into the mounting bracket 250. As used in this instance, keyed into refers to an axle 291 which has a varying diameter at the opposing ends 258, 259 so to lock into respective designated voids 251, 253 in the mounting bracket 250 and to avoid unbalanced movement of the arm. The axle 291 may be fixedly secured to the mounting bracket by way of any fasteners known in the art.

Figure 8:
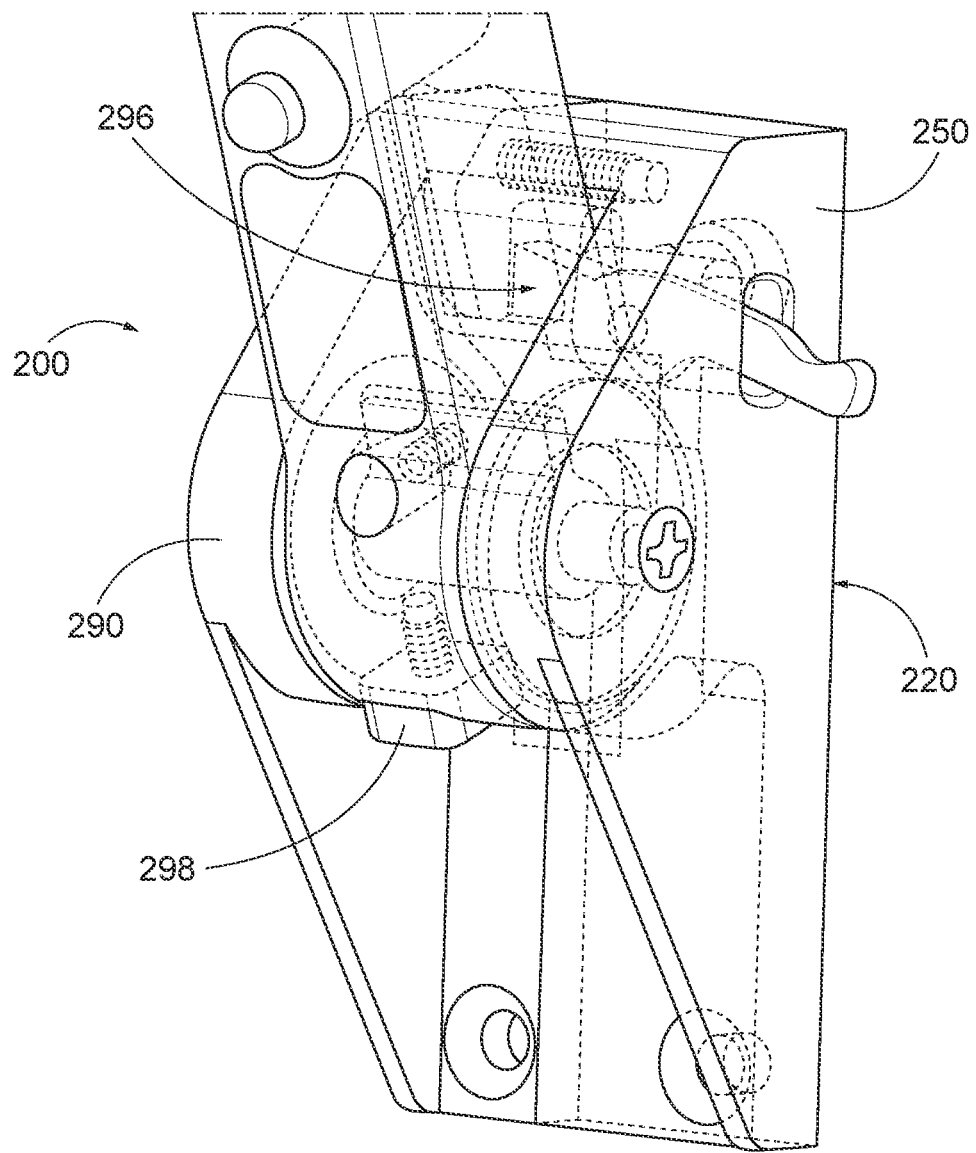
FIG. 8 is front perspective view of a mounting bracket for a personal electronic device holder with an articulating arm in a raised position, in accordance with an example of the disclosure.

Still referring to FIG. 7, a stop 298 is provided at the perimeter of the extension arm 260 in the hinge assembly 290. The stop 298 freely rotates within the hinge assembly 290 except when the engaging end 296 of the passenger activated latch 292 is engaged with the stop 298. In some examples, a Hanaya friction hinge may be relied on to further control and even maintain the articulating arm 200 in a position, independent of the stop 298. In FIG. 8 a front view of the second end 220 of the articulating arm 200, including the mounting bracket 250, is illustrated with the articulating arm 200 in a raised position. In this example, when the articulating arm 200 is in the raised position as the engaging end 296 of the passenger activated latch 292 is free of the stop 298 which rotates with the hinge assembly 290.

Figure 9:
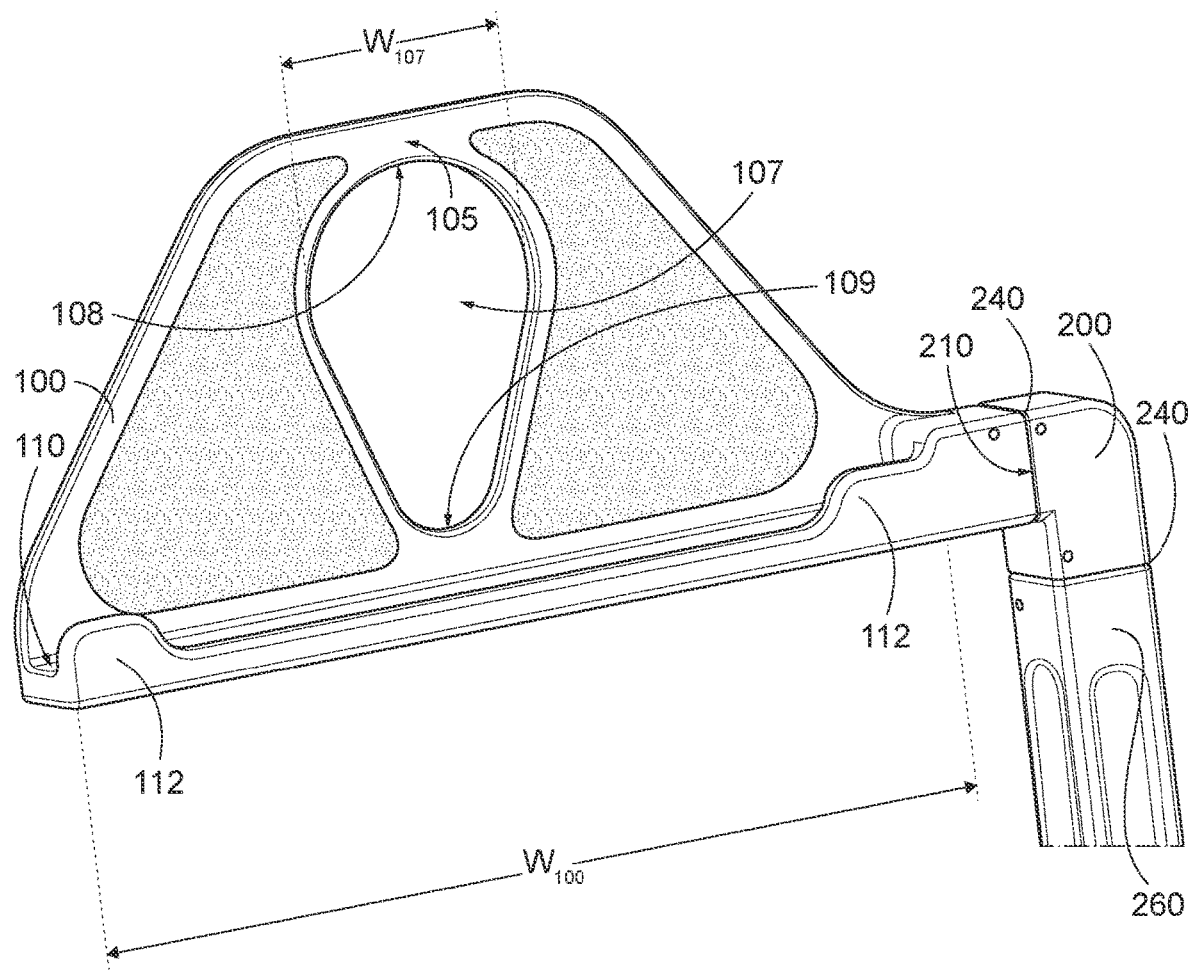
FIG. 9 is a front perspective view of a device platform, in accordance with an example of the disclosure.

FIG. 9 illustrates an example of a device platform 100 at a first end 210 of the articulating arm 200. In this example, the extension arm 260 of the articulating arm transitions through a joint 240 for positioning the device platform 100 relative the extension arm 260. The device platform 100 of FIG. 9 comprises a support surface 105 and bottom ledge 110 for supporting a personal electronic device. The bottom ledge 110 may further comprise one or more lips 112. The one or more lips 112 secure the personal electronic device and prevent it from sliding off a front end of the ledge 110. In some examples, the lip 112 may extend the entire width $W_{100}$ of the device platform 100. The support surface 105 may comprise a grip aperture 107 for securing a personal electronic device which has a grip or attachment secured to the back thereof. The backside grip of the personal electronic device may extend through the aperture allowing the backside of the personal electronic device to be supported directly by the support surface 105 of the device platform 100. The grip aperture 107 may additionally reduce in width $W_{107}$ from a top side 108 to a bottom side 109. In this instance, a backside grip of the personal electronic device may be inserted in through a greater width at the top side 108 where the personal electronic device may then be lowered onto the bottom ledge 110 of the device platform 100. As the personal electronic device is lowered and the backside grip transitions from a greater width at the top side 108 to a lesser width in the direction of the bottom side 109 the backside grip of the personal electronic device becomes secured within, or pinned into, the grip aperture 107. In some examples, the grip aperture may additionally, or alternatively, reduce laterally where the backside grip may become secured within the grip aperture 107 when the personal electronic device is slid laterally across the bottom ledge 110.

Figure 10:
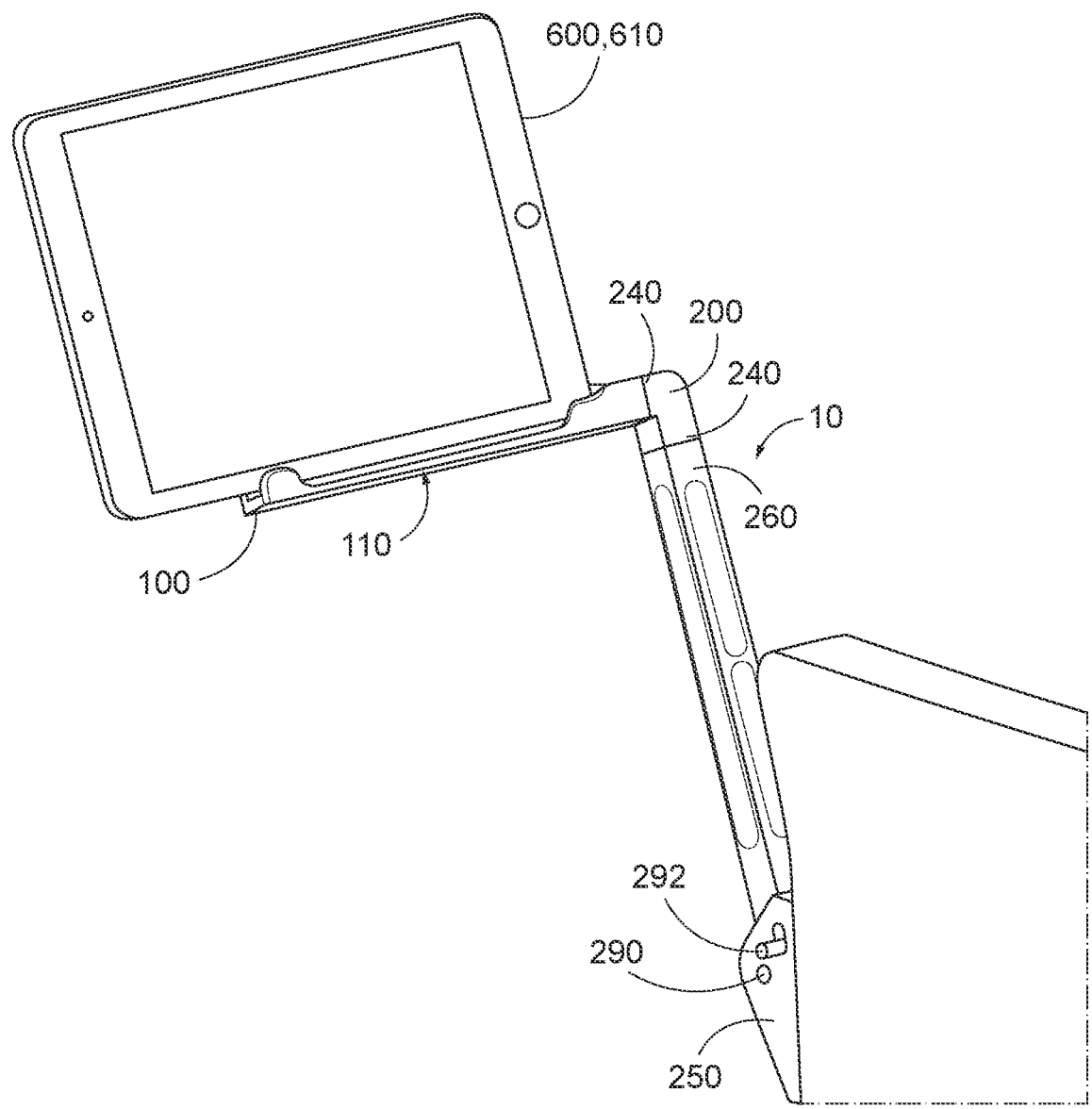
FIG. 10 is a front perspective view of a personal electronic device on a personal electronic device holder with an articulating arm in a raised position, in accordance with an example of the disclosure.

FIG. 10 illustrates a personal electronic device 600, where the personal electronic device is a tablet 610, supported by a device platform 100 of a personal electronic device holder 10. As illustrated by FIG. 10, the personal electronic device holder 10 comprises a device platform 100 having a bottom ledge 110 and a back (concealed by the tablet 610 in FIG. 10). The device platform 100 is attached to an articulating arm 200 at a first end 210 where the second end 220 is secured to an IAT 500. The articulating arm 200 comprises joints 240 for rotating and/or manipulating the position of the device platform 100. An extension arm 260 extends between a joint 240 and a mounting bracket 250. The extension arm 260 is secured to the mounting bracket 250 by a hinge assembly 290 operated by a passenger activated latch 292.

Figure 11:
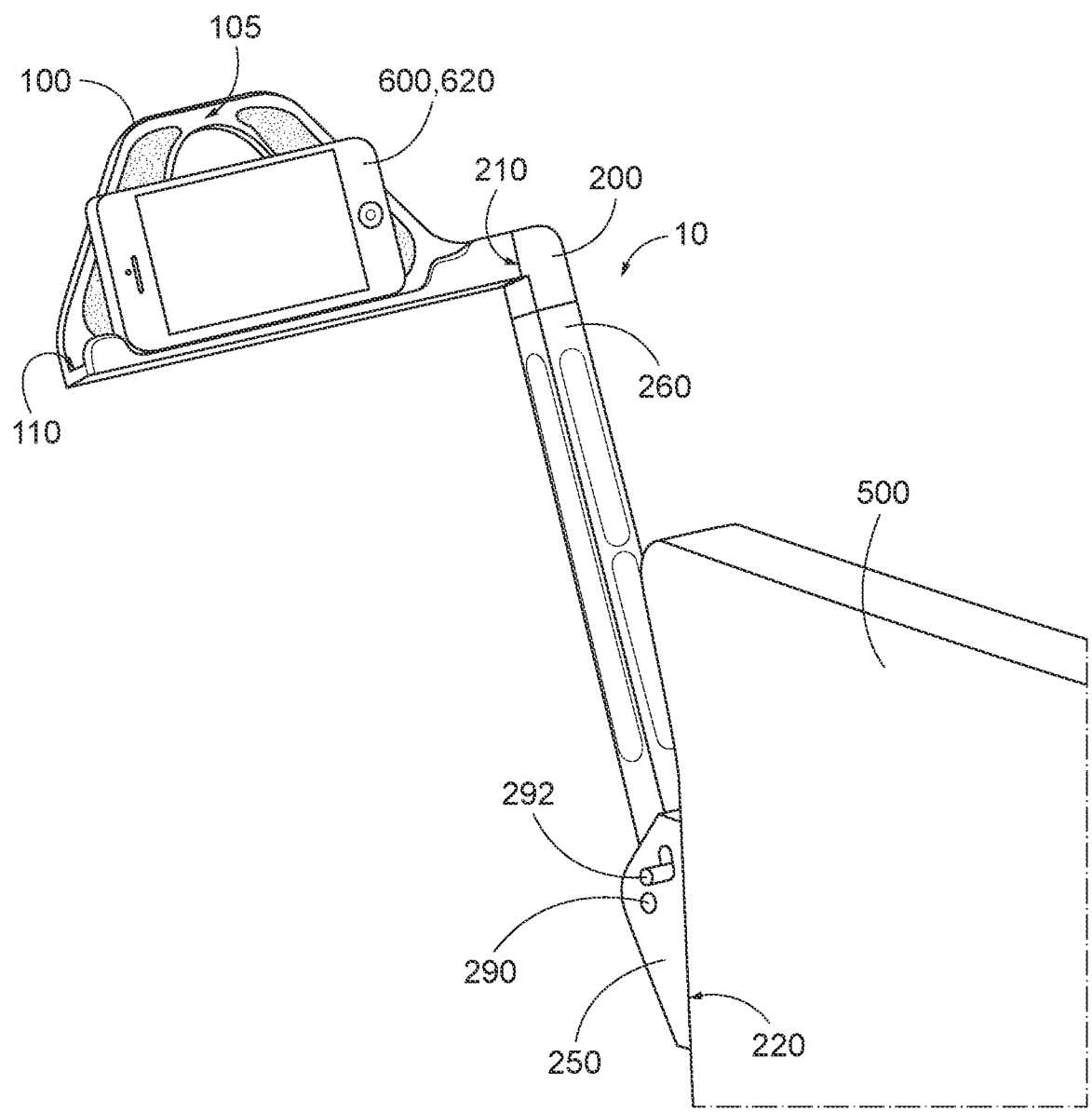
FIG. 11 is a front perspective view of a personal electronic device on a personal electronic device holder with an articulating arm in a raised position, in accordance with an example of the disclosure.

FIG. 11 illustrates a personal electronic device 600, where the personal electronic device is a smart phone 620, supported by a device platform 100 of a personal electronic device holder 10. Like FIG. 10, the personal electronic device holder 10 of FIG. 11 comprises a device platform 100 having a bottom ledge 110 and a support surface 105. The device platform 100 is attached to an articulating arm 200 at a first end 210 where the second end 220 is secured to an IAT 500. The articulating arm 200 comprises joints 240 for rotating and/or manipulating the position of the device platform 100. An extension arm 260 extends between a joint 240 and a mounting bracket 250. The extension arm 260 is secured to the mounting bracket 250 by a hinge assembly 290 operated by a passenger activated latch 292.

Figure 12:
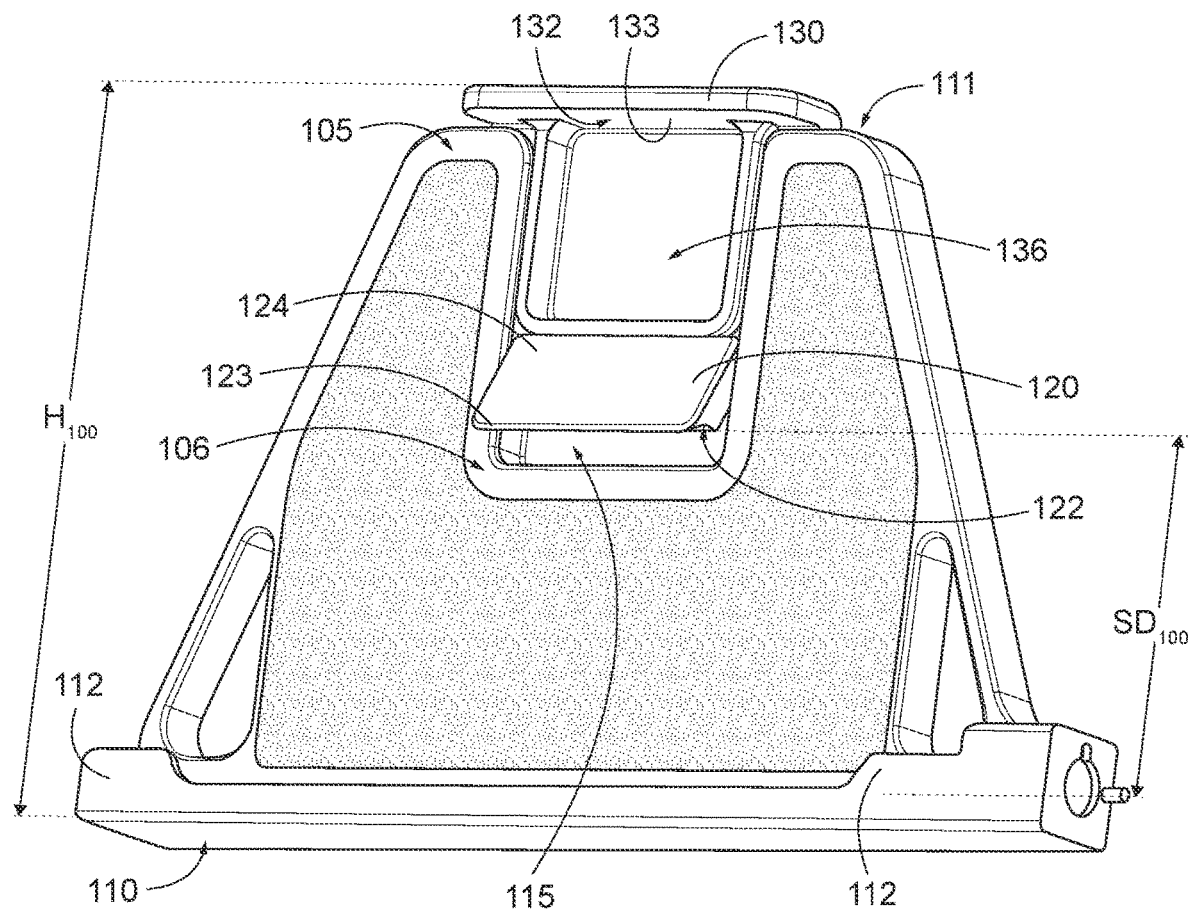
FIG. 12 is a front perspective view of a device platform for use with a smart phone, in accordance with an example of the disclosure.
Figure 13:
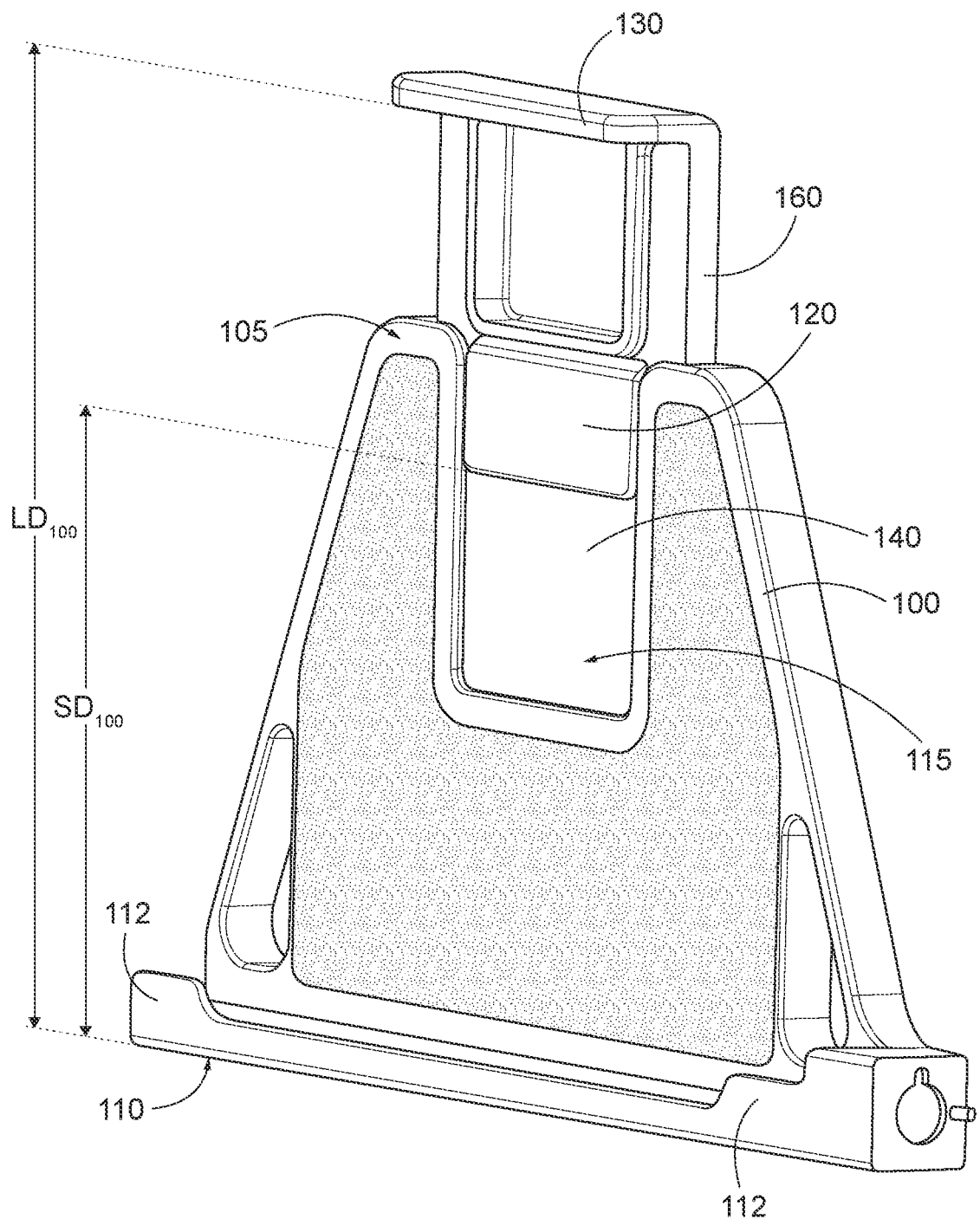
FIG. 13 is a front perspective view of a device platform for use with a large personal electronic device, in accordance with an example of the disclosure.

FIGS. 12-13 illustrate yet another device platform 100 of a personal electronic device holder 10. Like the device platform of FIGS. 9-11, this device platform 100 comprises a bottom ledge 110 with one or more lips 112 and a support surface 105. The device platform of FIGS. 12-13 additionally, or alternatively, comprises a small device clamp 120 and/or a large device clamp 130. A device platform 100 having one or more clamps is, generally, referred to herein as the clamp mount assembly. The small device clamp 120 may be relied on for securing a device such as, for example, a smart phone and/or handheld game system. The large device clamp 130 may be relied on for securing a device such as, for example, a tablet and/or laptop computer. The device platform 100 of FIG. 12 may be used in combination with the extension arm 260 and articulating arm 200 as described above.

In FIG. 12, the device platform 100 of a clamp mount assembly is illustrated in an unused condition. In the unused condition, the small device clamp 120 is maintained in an outward position where the bottom edge 122 of the small device clamp 120 extends from a front face 106 of the device platform support surface 105. In this example, the bottom edge 122 of the small device clamp 120 is maintained in the outward position by a spring-loaded assembly positioned at hinged top side 124. In some examples, as an alternative to a hinged assembly, the entire clamp may be maintained in an outward position along a track where one or more compression springs force the small device clamp 120 from the front face 106 of the device platform support surface 105. The spring loaded assembly, as well as the small device clamp 120, may, otherwise, be recessed into a void 115 formed in the device platform support surface 105. When in use, a small device may be positioned below the bottom edge 122, which may further comprise a lip 123. The lip 123 may extend over an edge and/or onto the face of the small device in order to pin the device between the lip 123 and the front face 106 of the device platform support surface 105. The small device is additionally supported by the bottom ledge 110 and the one or more lips 112. In the instance the size of the small device is greater than a distance $SD_{100}$ between the small device clamp 120 and the bottom ledge 110, but not large enough for the use with the large device clamp 130, the small device clamp 120 is adjustable in a direction of the height $H_{100}$ of the device platform 100. Specifically, the small device clamp 120 may slide in a direction of the height $H_{100}$ of the device platform relative the device platform support surface 105 by way of a slide assembly. The small device clamp may slide relative the device platform support surface 105 within the void 115 in the device platform support surface 105 such as that illustrated by FIG. 13. A slide assembly that also includes a compression assembly will be discussed in greater detail below with respect to FIG. 14.

Still referring to FIG. 12, the large device clamp 130 is above the small device clamp 120 within the void 115 in the device platform support surface 105. The large device clamp comprises a top edge 132 which extends from the front face 106 of the device platform support surface 105. In FIG. 12, the top edge 132 of the large device clamp 130 is positioned at a top side 111 of the device platform where the balance of the large device clamp 130 is maintained in the void 115 or to a backside of the device platform 100. The top edge 132 may additionally comprise one or more lips 133 for further securing a large device to the device platform 100. Like positioning a small device under the bottom edge 122 of the small device clamp 120, a large device may be positioned within the large device clamp 130 by inserting a top edge of the large device under the top edge 132 and forcing the top edge 132 upward until a bottom edge of the large device is positioned on the bottom ledge 110 of the device platform 100. The large device clamp 130 may operate on the same slide assembly and compression assembly as the small device clamp, as will be discussed in greater detail below with respect to FIG. 14.

Additional voids, recesses, and/or apertures may be provided in the device platform support surface 105 to reduce the overall weight of the device platform 100. Additionally, or alternatively, a void 136, or the like, may be provided within the large device clamp 130 for the same. The voids, recesses, and/or apertures may also be provided to secure additional device attachments such as, for example, a wireless charger, cables, or the like.

Turning to FIG. 13, a clamp assembly 160 comprising both the small device clamp 120 and the large device clamp 130 is illustrated in an extended position, such as when a large device may be positioned within the large device clamp 130. Specifically, when a large device is positioned within the large device clamp 130 it may be positioned overtop the small device clamp 120. When positioned overtop the small device clamp 120 the large device presses the small device clamp 120 into the void 115 formed in the backside of the device platform support surface 105 so the large device may rest directly on the device platform support surface 105. The small device clamp is maintained within the void 115 under the weight of the large device but, upon removal of the large device, the small device clamp re-emerges from the void 115 for use with a small device. As illustrated by FIG. 13, by way of the slide assembly 140 and compression assembly 150, the distance $SD_{100}$ between the small device clamp 120 and the bottom ledge 110 as well as the distance $LD_{100}$ between the top edge 132 of the large device clamp 130 and the bottom ledge 110 increases and may vary depending upon the size and orientation of the small device or the large device and the corresponding clamp being relied on.

Figure 14:
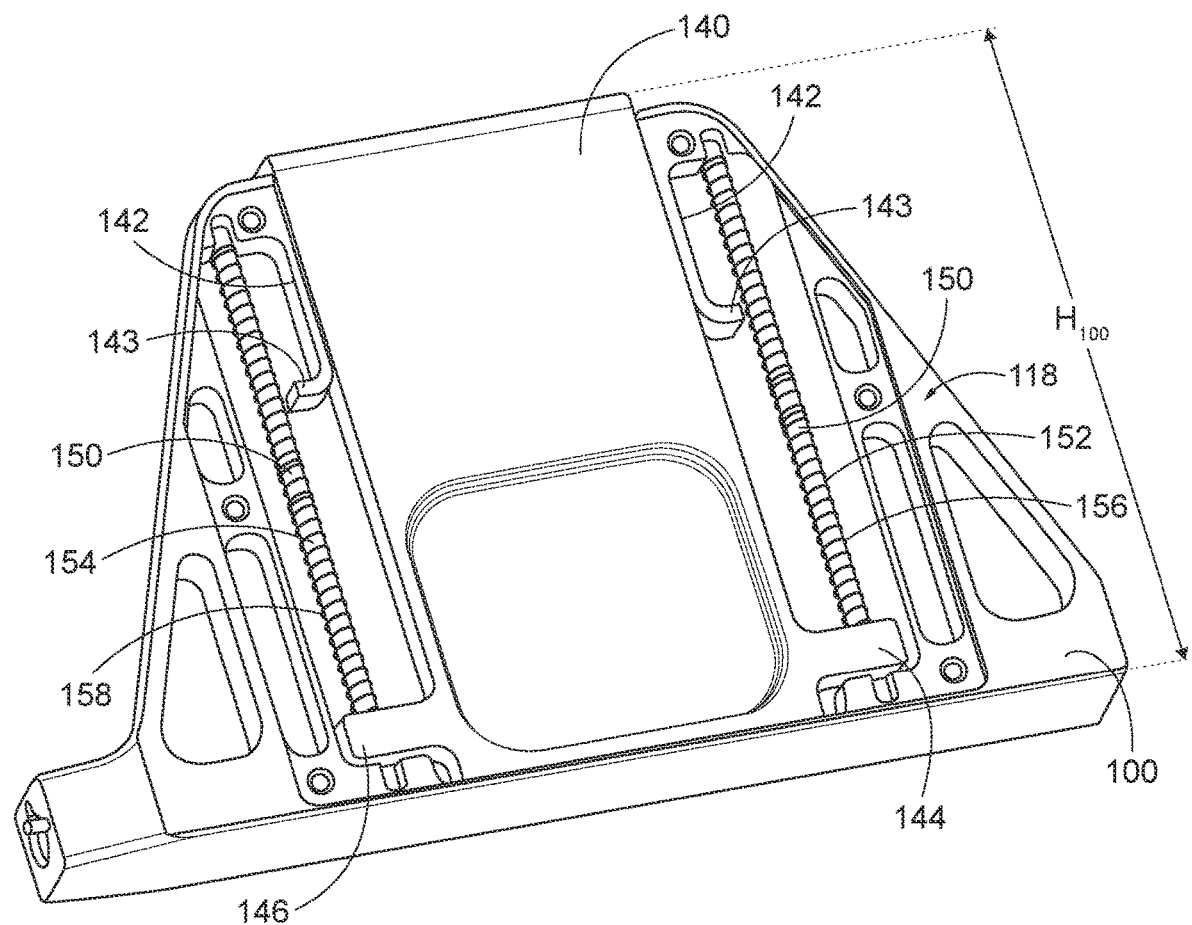
FIG. 14 is a rear perspective view of a device platform, in accordance with an example of the disclosure.

As noted above, FIG. 14 illustrates the slide assembly 140 and compression assembly 150. FIG. 14 is a view of the backside 118 of the device platform 100. A slide assembly 140 comprising the small device clamp 120 and the large device clamp 130 is illustrated. The slide assembly 140 is positioned within a track 142. The track 142 guides the slide assembly 140 vertically, or in a direction of the height $H_{100}$ of the device platform 100. The track may additionally comprise one or more stops 143 for stopping the movement of the slide assembly 140 before it disengages from the device platform 100. The device platform 100 may additionally comprise a compression assembly 150. In FIG. 14, the compression assembly comprises two opposing guides 152, 154. The guides 152, 154 of FIG. 14 are rods which extend the height $H_{100}$ of the device platform 100 at opposing sides of the slide assembly 140. The slide assembly 140 may comprise one or more tabs 144, 146 which align with and slide along a respective guide 152, 154. This further supports the slide assembly 140 while in motion, in addition to the track 142, and provides tight tolerances to prevent binding between the slide assembly 140 and the device platform 100. Additionally, or alternatively, the guides 152, 154 may float between the backside 118 of the device platform 100 and the slide assembly 140 to eliminate sensitivity to tight tolerances and eliminate binding. The compression assembly 150 also comprises springs 156, 158 at, or about, the two opposing guides 152, 154, respectively. Each compression springs 156, 158 may be seated upon a respective tab 144, 146 and also seated at an opposing end within the device platform 100. The compression springs 156, 158 operate between the slide assembly 140 and the device platform 100 to provide compressive force to the slide assembly 140 and thereby the small device clamp 120 and the large device clamp 130. By way of the compressive force, the personal electronic device may be secured within a clamp mount assembly of the device platform. In the example of FIG. 14, The guides 152, 154 and the compression springs 156, 158 are maintained within a void formed in the backside 118 of the device platform 100. A cover may also be provided at the backside 118 of the device platform 100 to conceal these components (e.g. the slide assembly 140 and/or the compression assembly 150) of the device platform 100 from a user.

FIGS. 15-27 illustrate yet another personal electronic device holder 10. The personal electronic device holder 10 of FIGS. 15-27 is a personal electronic device holder 10 that is mounted to the backside 510 of a passenger seat 500. Such a personal electronic device holder 10 would be for use by a passenger positioned in a seat directly behind the passenger seat 500. FIGS. 15-27 illustrate the personal electronic device holder 10 integrally formed within the backside 510 of the passenger seat 500. It is appreciated herein that the personal electronic device holder 10 may also be provided as a retrofit to an existing seat with the features as described in greater detail below. For example, the features as described in greater detail below may be secured directly to an existing seat backside on the face of the existing seat backside.

Additionally, it is appreciated herein that the personal electronic device holder 10 may wirelessly charge a personal electronic device by way of a wireless charger 520. The wireless charger 520 may travel with, or relative to, the device clamps for maintaining the personal electronic device in a charging position relative to the wireless charger 520. As will be described in greater detail below, the wireless charger may be concealed by the personal electronic device holder 10 and the backside 510 of the passenger seat 500 while still maintaining a charging position.

Figure 15:
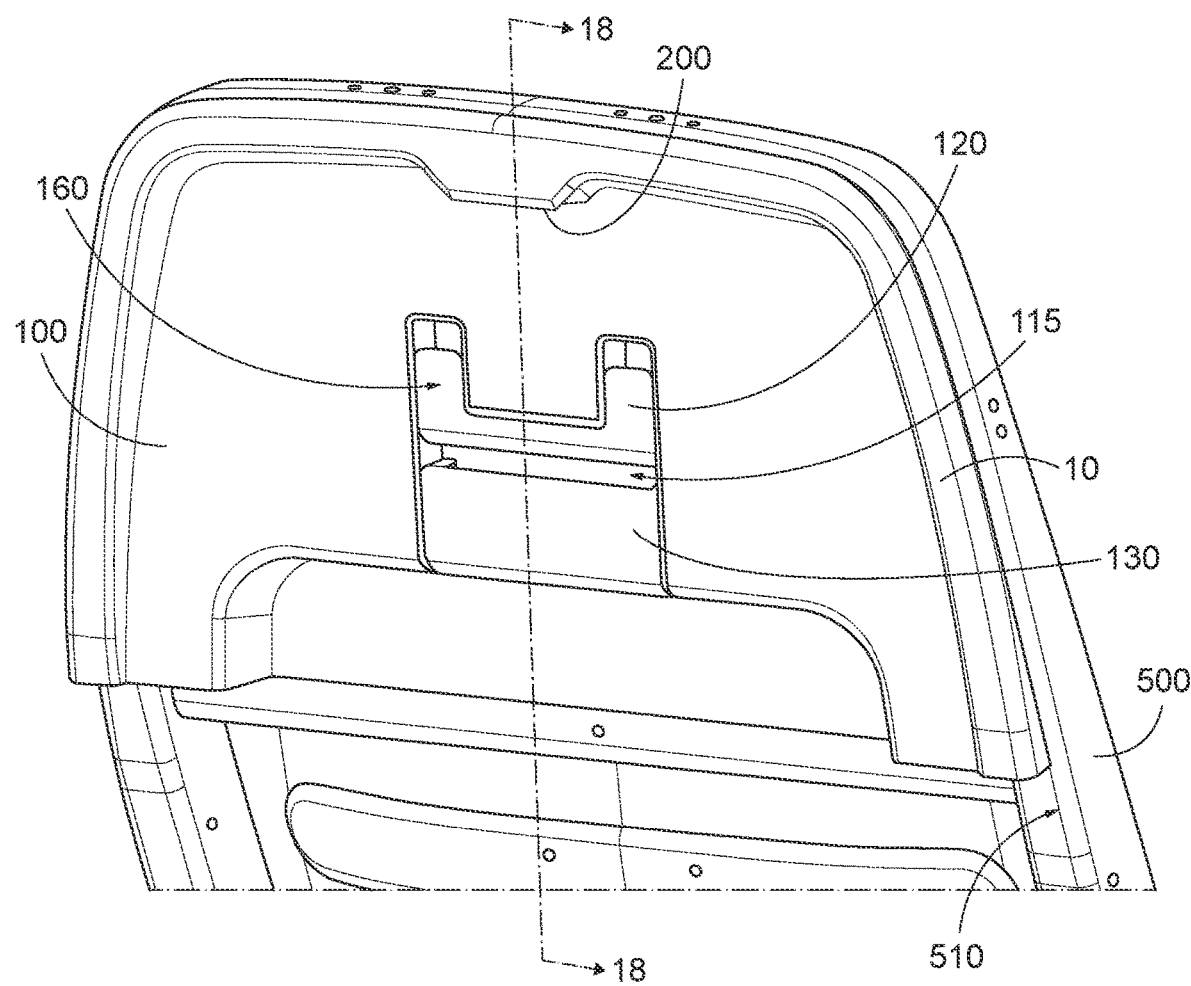
FIG. 15 is a perspective view of a passenger vehicle seatback having a personal electronic device holder, in accordance with an example of the disclosure.
Figure 16:
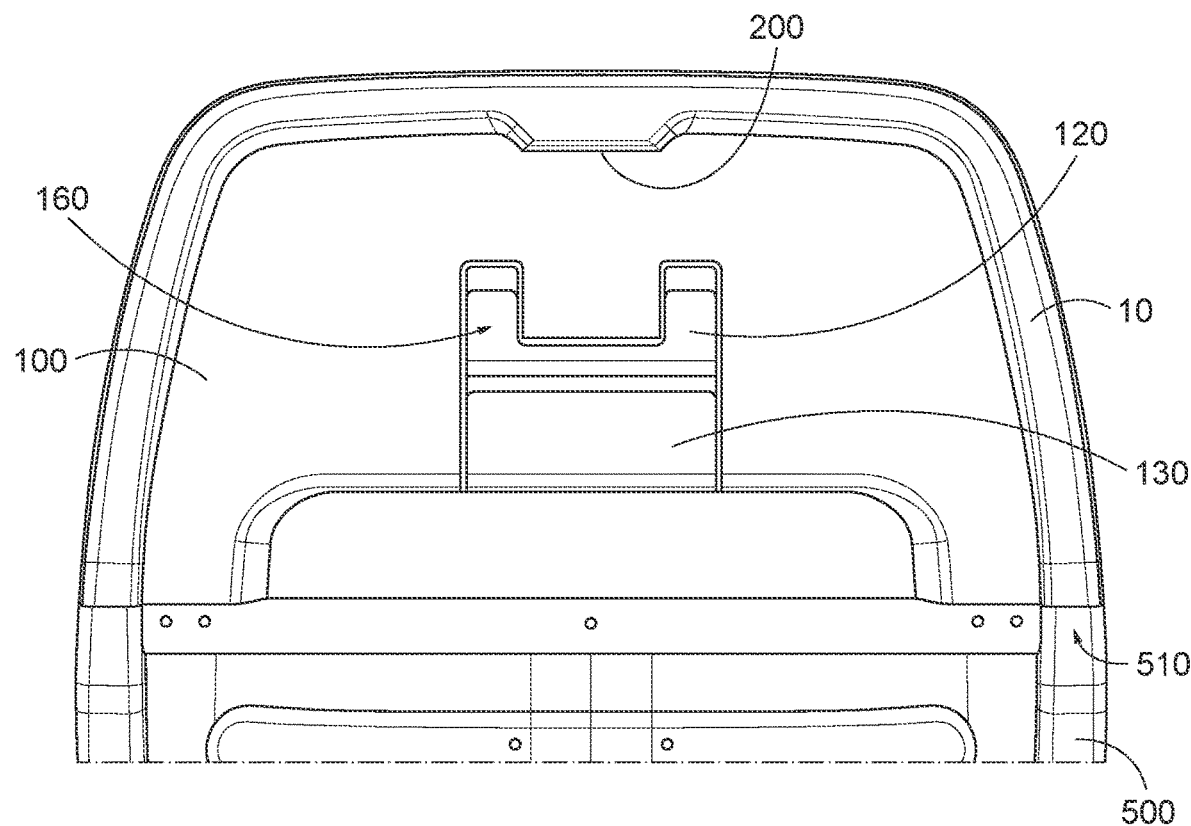
FIG. 16 is a backside view of a passenger vehicle seatback having a personal electronic device holder, in accordance with an example of the disclosure.

In FIGS. 15-16, a personal electronic device holder 10 is illustrated. The personal electronic device holder 10 comprises a device platform 100. In this example, the device platform 100 is the surface formed to the backside 510 of the seat 500 on which the backside a personal electronic device may mate. The device platform 100 comprises a void 115, or recess, in which one or more device clamps 120, 130 are positioned on a clamp assembly 160. In the example of FIGS. 15-16, a small device clamp 120 and a large device clamp 130 are provided. The small device clamp 120 and the large device clamp 130 are positioned on the clamp assembly 160 which further comprises a slide assembly 140 and a compression assembly 150 (illustrated by FIGS. 19-20). The personal electronic device holder 10 of FIG. 15 also comprises a top retention tab 200. The top retention tab 200 is provided to hold an upper edge of a personal electronic device. The top retention tab 200 may further comprise a rubber pad, neoprene pad, or the like to protect the personal electronic device. In FIGS. 15-16, the top retention tab 200 extends from the device platform 100 so to extend past or about an edge of a personal electronic device.

FIG. 17 is a side view of a seat 500 having a personal electronic device holder 10. In this example, the personal electronic device holder 10 is positioned opposite the headrest assembly 502 of the seat 500 to the backside 510 of the seat. In FIG. 17, the personal electronic device holder 10 is recessed into the backside 510 of the seat. FIG. 17, however, additionally illustrates the personal electronic device holder 10 extending from the backside 510 of the seat 500. Accordingly, a personal electronic device holder 10 may additionally be provided wherein the personal electronic device holder is attached to the exterior of an existing backside 510 of a seat 500.

FIG. 18 illustrates a cross section of a seat assembly taken at line 18-18 of FIG. 15. In FIG. 18, the personal electronic device holder 10 is provided in the backside 510 of the seat 500. The device platform 100 is provided in the backside 510 of the seat for positioning a personal electronic device. A void 115 is formed in the device platform 100. In the void 115 is the clamp assembly 160 comprising the small device clamp 120 and the large device clamp 130. As will be discussed in greater detail with respect to FIG. 25 the void 115 extends below the clamp assembly 160 for movement of the clamp assembly 160 therein. Extending from the face of the device platform 100 is the top retention tab 200 for securing and supporting a top side edge of a personal electronic device.

Figure 19:
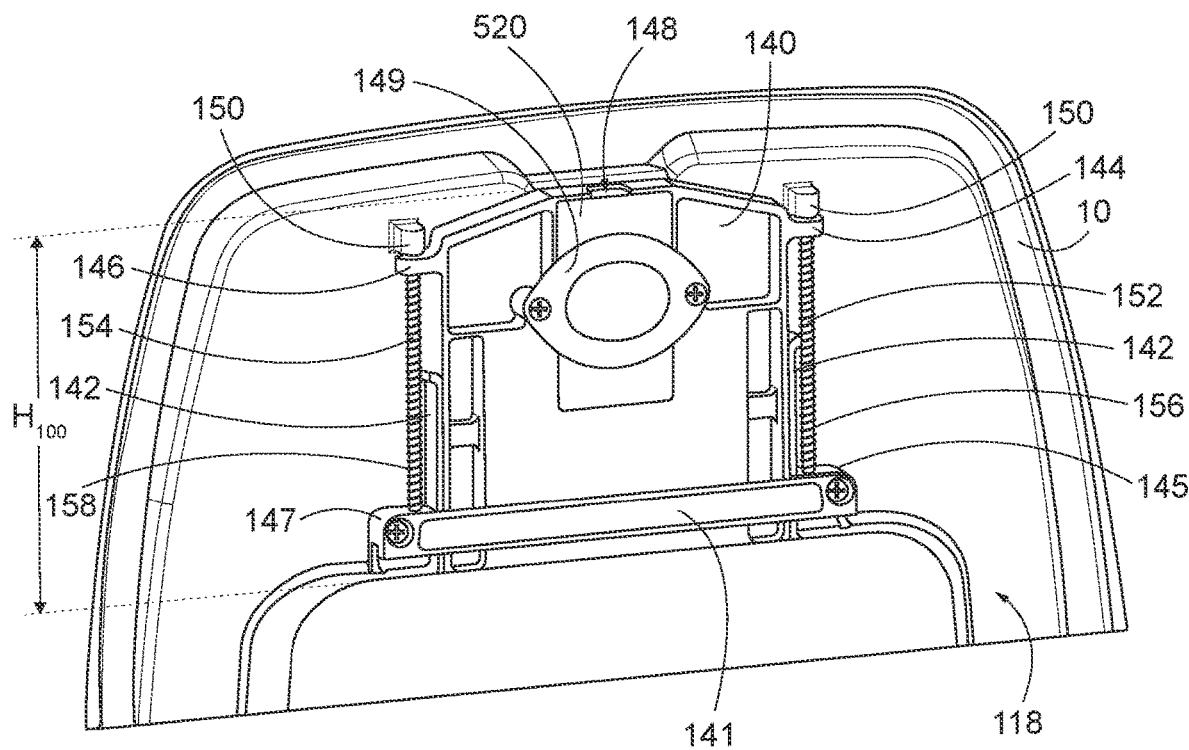
FIG. 19 is a rear view of a personal electronic device holder with the slide assembly in a seated position for use in a passenger vehicle seatback, in accordance with an example of the disclosure.

Turning now to FIG. 19, a personal electronic device holder 10 is illustrated from the internal side of the seat 500. In FIG. 19 a slide assembly 140 and a compression assembly 150 are illustrated. The slide assembly 140 further comprises the small device clamp 120 and the large device clamp 130 (illustrated by FIGS. 15-16 and 18). The slide assembly 140 is positioned within a track 142. The track 142 guides the slide assembly 140 vertically, or in a direction of the height $H_{100}$ of the device platform 100. The track may additionally comprise one or more stops 143 for stopping the movement of the slide assembly 140 before it disengages from the personal electronic device holder 10. The personal electronic device holder 10 may additionally comprise a compression assembly 150. In FIG. 19, the compression assembly comprises two opposing guides 152, 154. The guides 152, 154 of FIG. 19 are rods which extend the height $H_{100}$ of the device platform 100 at opposing sides of the slide assembly 140. The slide assembly 140 may comprise one or more tabs 144, 146 which align with and slide along a respective guide 152, 154. This further supports the slide assembly 140, in addition to the track 142, providing tight tolerances while in motion and to prevent binding between the slide assembly 140 and the device platform 100. The compression assembly 150 also comprises springs 156, 158 at, or about, the two opposing guides 152, 154, respectively. Each compression springs 156, 158 may be seated upon a respective tab 144, 146. The compression springs 156, 158 operate between the slide assembly 140 and the device platform 100 to provide compressive force to the slide assembly 140 and thereby the small device clamp 120 and the large device clamp 130. By way of the compressive force, the personal electronic device may be secured within a clamp mount assembly of the device platform. In the example of FIG. 19, The guides 152, 154 and the compression springs 156, 158 are maintained on a backside 118 of the device platform. These components are concealed by the seat 500 and the device platform 100, when the device platform 100 is positioned within or on the backside 510 of the seat 500.

FIG. 19 also illustrates a void 148, or recess, within the slide assembly 140. The void 148 of the slide assembly 140 may be for providing a concealed wireless charger 520 within the personal electronic device holder 10. This provides additional functionality to a user without the need for charging a personal electronic device by cord or cable. The wireless charger 520 may be directly connected to and powered through an existing power supply at or within the seat. The device platform 100 may be removable from the backside 510 of the seat 500 for accessing the slide assembly 140, compression assembly 150, and/or the wireless charger 520 (e.g. for maintenance, adjustment, recharging, etc.). A strap 149, such as that illustrated by FIG. 19 may also be provided to secure the wireless charger 520 when the device platform 100 is removed from the backside 510 of the seat 500. In other words, the wireless charger 520 and the strap 149 travel with and are removed from the backside 510 of the seat 500 with the device platform 100. The strap 149 may be made of an elastomeric material, or other stretchable material, so that it may be stretched for removal and replacement of the wireless charger 520. Additionally, or alternatively, the strap 149 may be removable at one end or another (or both) for the same reason. In the example of FIG. 19, the wireless charger 520 travels with the slide assembly 140, or relative to the slide assembly 140. By traveling with the slide assembly 140 the wireless charger is maintained in a charging position relative a personal electronic device that is positioned within the small device clamp and/or the large device clamp. In other words, the wireless charger 520 moves with the small device clamp and/or the large device clamp on the slide assembly 140 to maintain the charging position. The charging position may be such a position where a personal electronic device is positioned overtop the wireless charger, relative a charging surface of the wireless charger. More generally, the charging position is where a charge is maintained between the personal electronic device and the wireless charger. Although a wireless charger is illustrated herein the personal electronic device holder may be provided without a wireless charger and/or the supporting features for a wireless charger in an alternative example.

A guide strap 141 may also be provided for securing and guiding the slide assembly 140. In FIG. 19, the guide strap 141 is secured across the slide assembly 140 and the compression springs 156, 158 of the compression assembly 150. The guide strap 141 may be relied on to secure the slide assembly 140 within the tracks 142. The guide strap 141 may additionally, or alternatively, be relied on to secure each compression spring 156, 158 within tabs 144, 146 formed in the backside 118 of the device platform 100. In the Example of FIG. 19, the tabs 144, 146 secure a bottom side of the opposing guides 152, 154 and a bottom side of the springs 156, 158 on the guides 152, 154. The opposing guides 152, 154 extend the height $H_{100}$ of the device platform 100 and are secured by tabs 145, 147 adjacent the top side of the slide assembly 140. In this example, the tabs 144, 145, 146, 147 and the guides 152, 154 are maintained with the device platform 100. The compression springs 156, 158 of the compression assembly 150 abut the tabs 144, 146 providing a compressive force to the tabs 144, 146 driving the slide assembly 140 upward within the track 142. In operation, the tabs 144, 146 may abut the stops 143 preventing the slide assembly 140 from extending from within the track 142.

Figure 20:
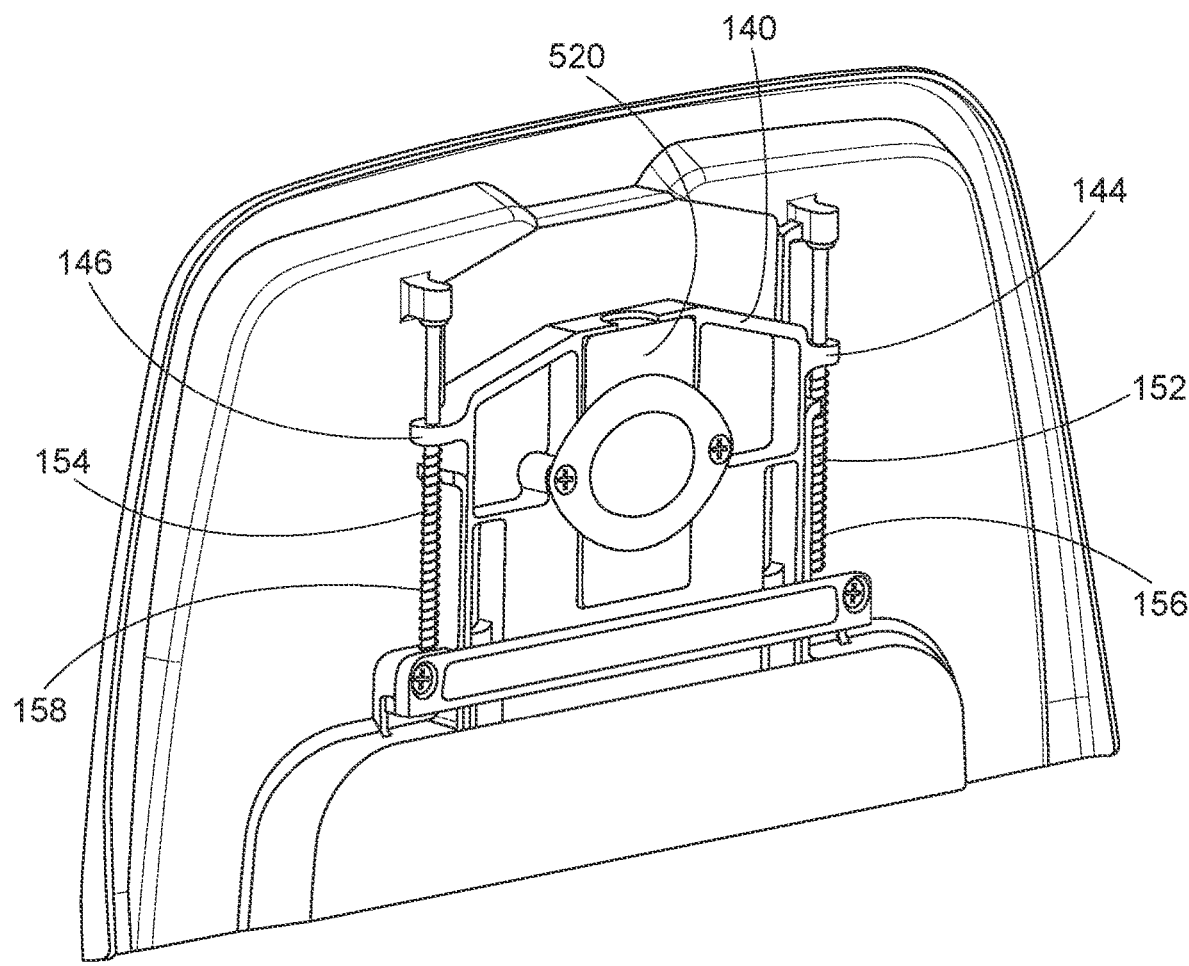
FIG. 20 is a rear view of a personal electronic device holder with the slide assembly in an extended position for use in a passenger vehicle seatback, in accordance with an example of the disclosure.
Figure 21:
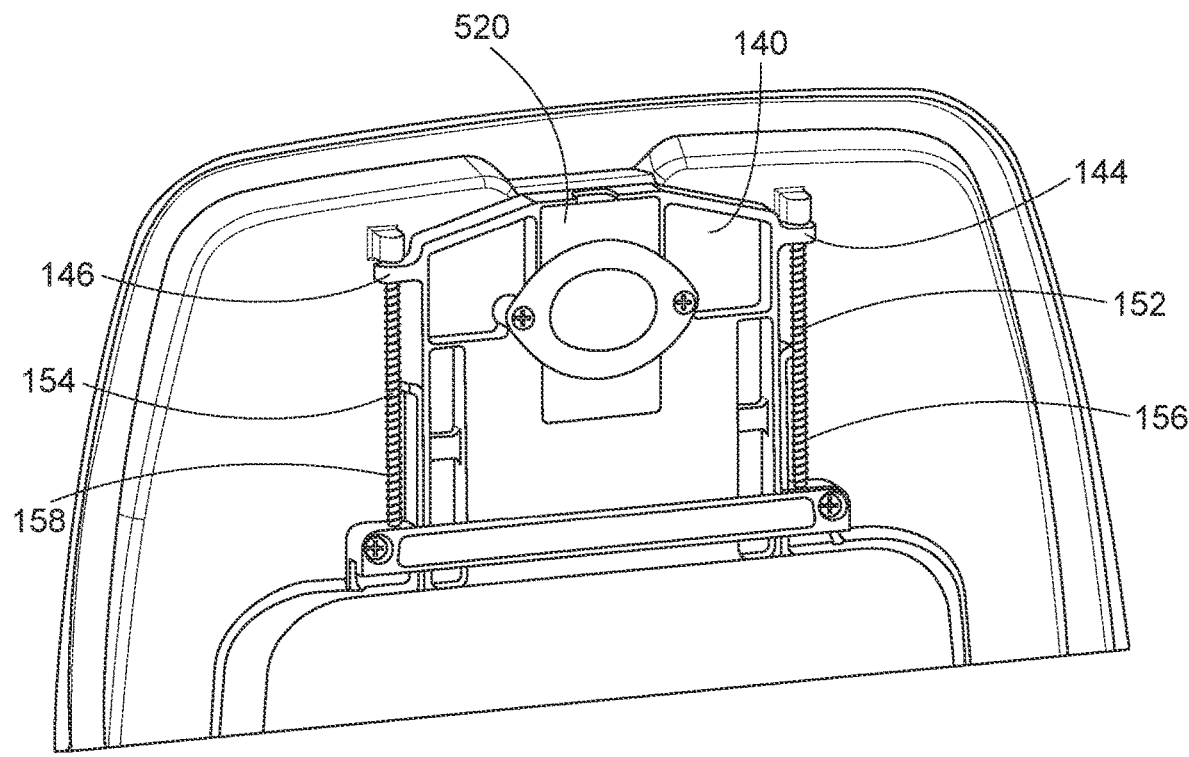
FIG. 21 is a rear view of a personal electronic device holder with the slide assembly in a seated position for use in a passenger vehicle seatback, in accordance with an example of the disclosure

FIGS. 20-21 illustrates the slide assembly 140 in an extended position and a seated position, respectively. In the extended position the tabs 144, 146 compress the compression springs 156, 158 on the guides 152, 154. A personal electronic device may then be secured by the clamp assembly 160 under the force of the compression springs 156, 158. When a personal electronic device is not being secured, the compression springs 156, 158 return the slide assembly to its seated position, as illustrated by FIG. 21. In FIG. 20, a wireless charger 520 is illustrated. In FIG. 20 the wireless charger 520 moves with the slide assembly 140. This insures the wireless charger 520 is operable with various sized personal electronic devices or personal electronic devices positioned between the profile and landscape orientations.

Figure 22:
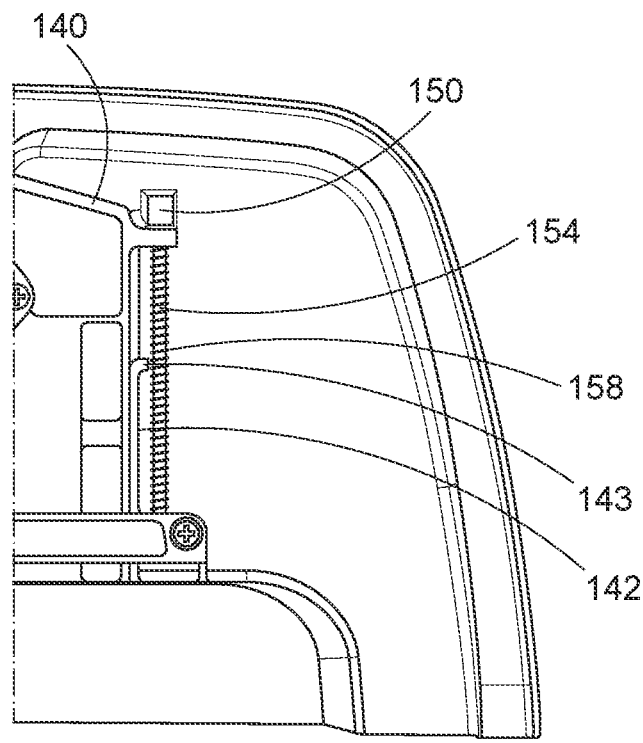
FIG. 22 is a partial rear view of a personal electronic device holder, in accordance with an example of the disclosure.

FIG. 22 is a partial view of the slide assembly 140 and compression assembly 150. In FIG. 22, the compression spring 158 wraps about the guides 154 in a helical arrangement. By wrapping the compression spring 158 about the guide 154, the compression spring 158 is maintained in place during operation. Additionally, by wrapping the compression spring 158 about the guide, the compression spring 158 is prevented from flexing within the assembly and contacting the track 142 the stop 143 or other adjoining components. This eliminates wear as well as noise caused by friction between the components.

Figure 23:
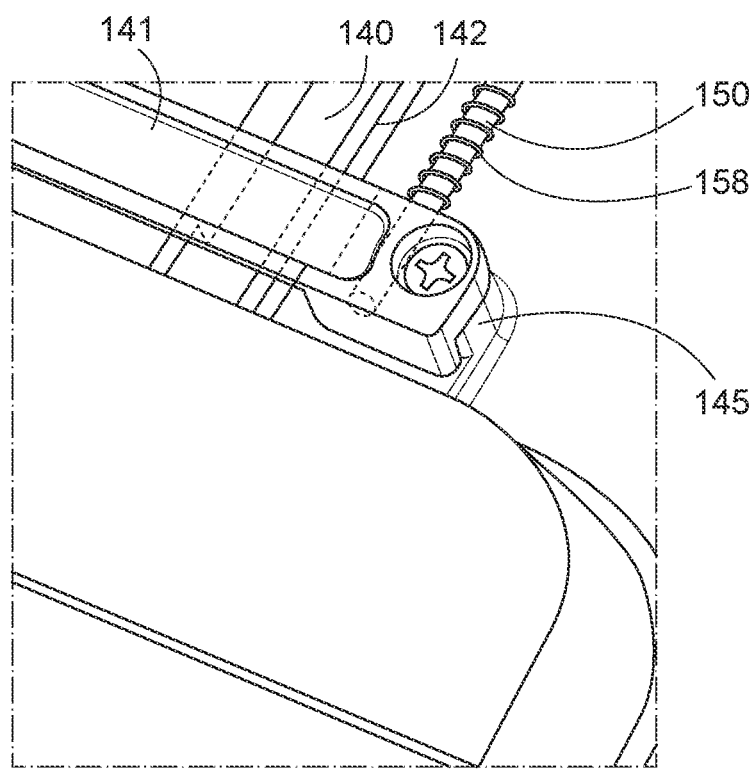
FIG. 23 is a partial rear view of a slide assembly of a personal electronic device holder, in accordance with an example of the disclosure.
Figure 24:
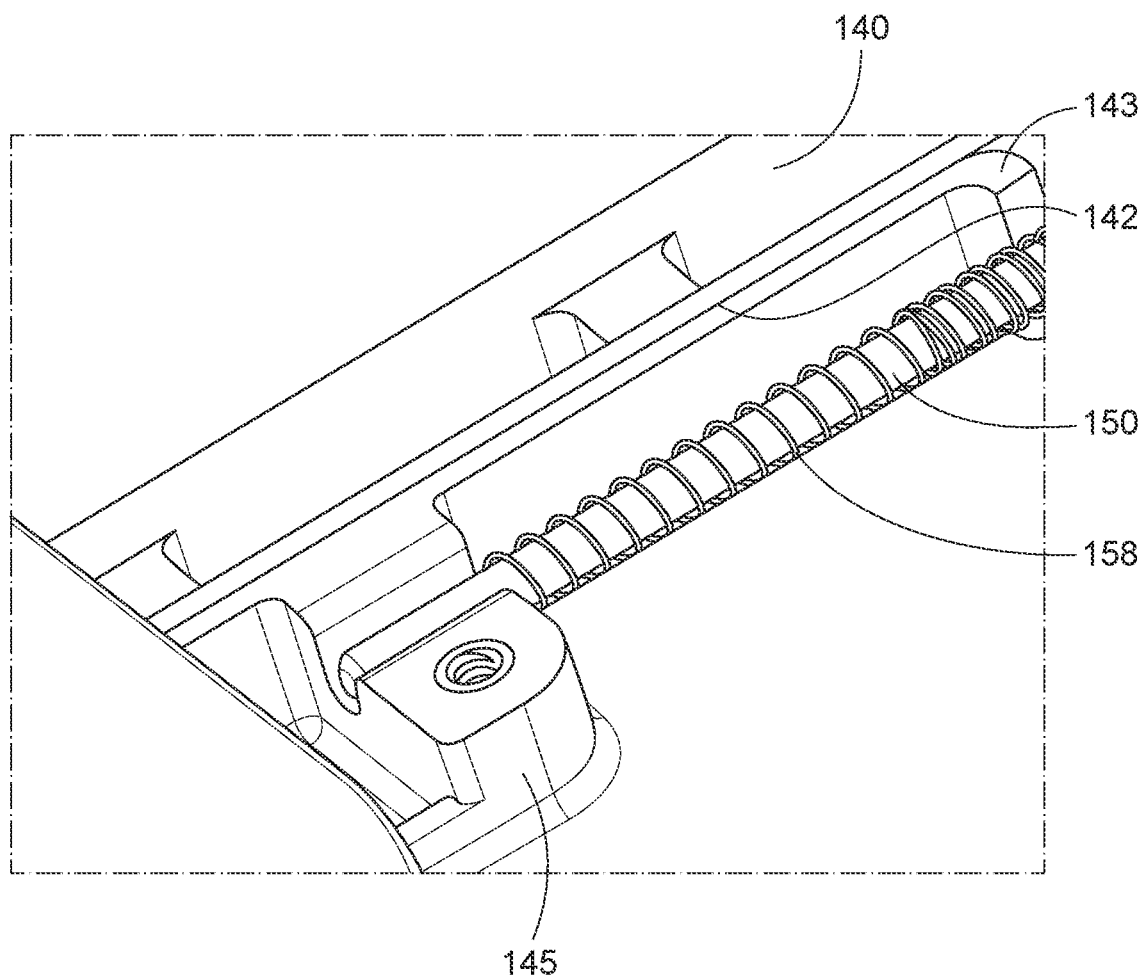
FIG. 24 is a partial rear view of a slide assembly of a personal electronic device holder, in accordance with an example of the disclosure.

FIGS. 23-24 are also partial views of the slide assembly 140 and the compression assembly 150. In FIG. 23, the guide strap 141 is illustrated. As discussed above, the guide strap 141 is secured across the slide assembly 140 and the compression springs 158 of the compression assembly 150. The guide strap 141 may be relied on to secure the slide assembly 140 within the tracks 142. The guide strap 141 may additionally, or alternatively, be relied on to secure each compression spring 158 within tabs 145 formed in the track 142 or adjacent to the track 142. As illustrated by FIG. 24, The guide strap 141 may be removably secured for the removal, replacement, and/or maintenance of the slide assembly 140 and the compression assembly 150.

Figure 25:
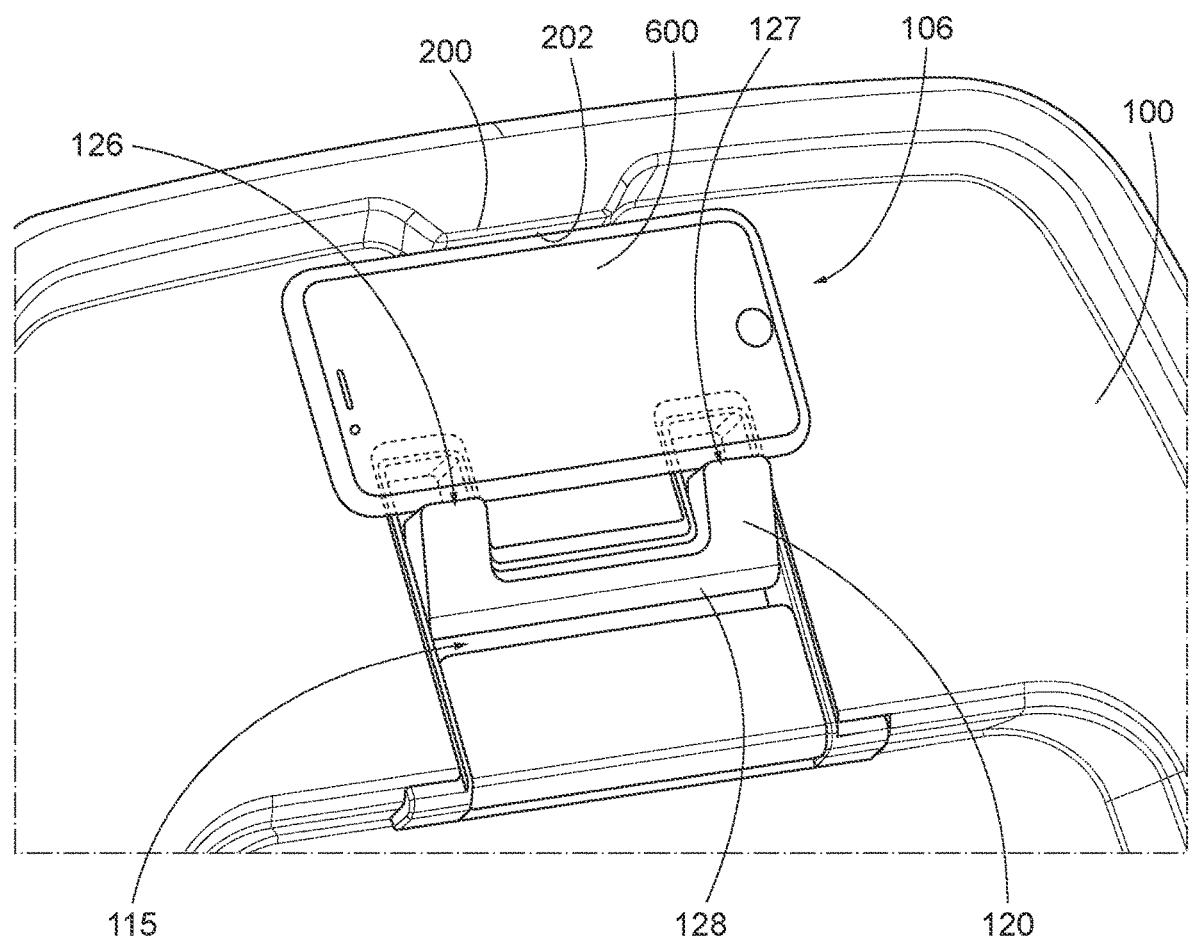
FIG. 25 is a backside view of a passenger vehicle seatback having a personal electronic device holder with a small personal electronic device, in accordance with an example of the disclosure.
Figure 26:
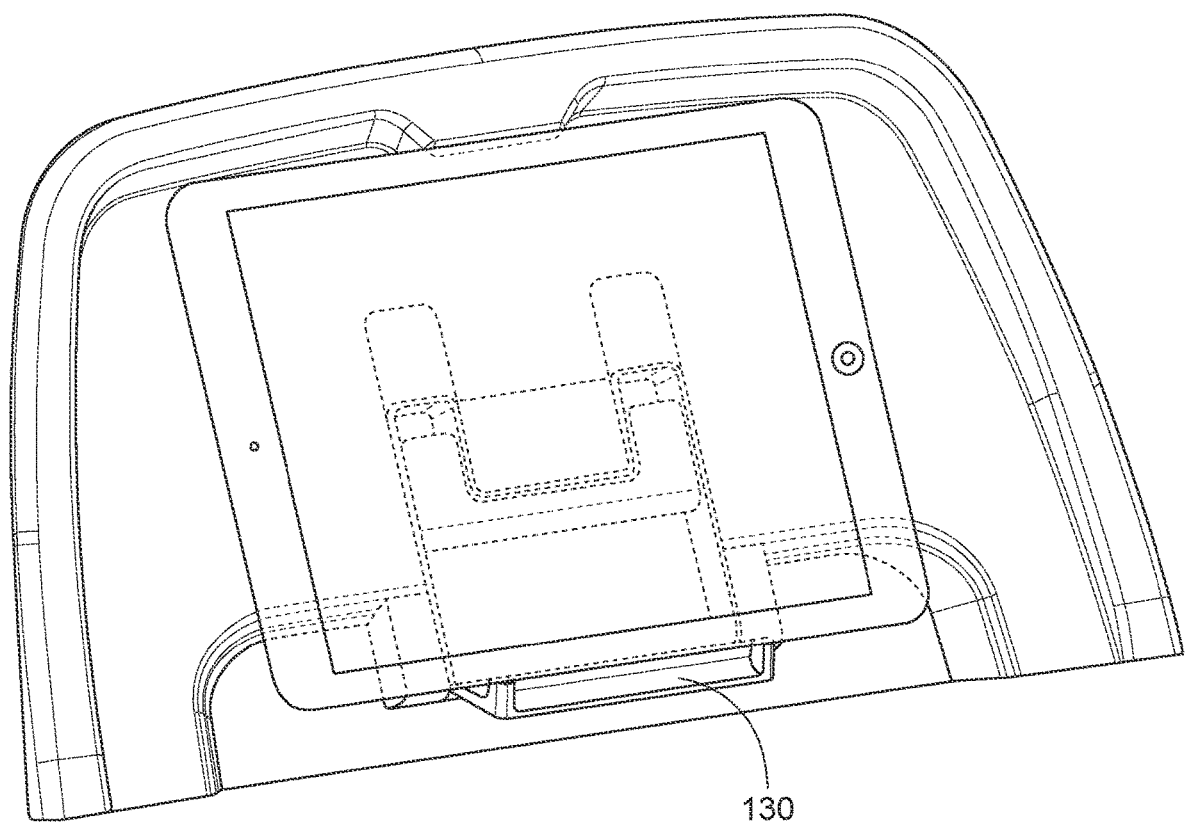
FIG. 26 is a backside view of a passenger vehicle seatback having a personal electronic device holder with a large personal electronic device, in accordance with an example of the disclosure.
Figure 27:
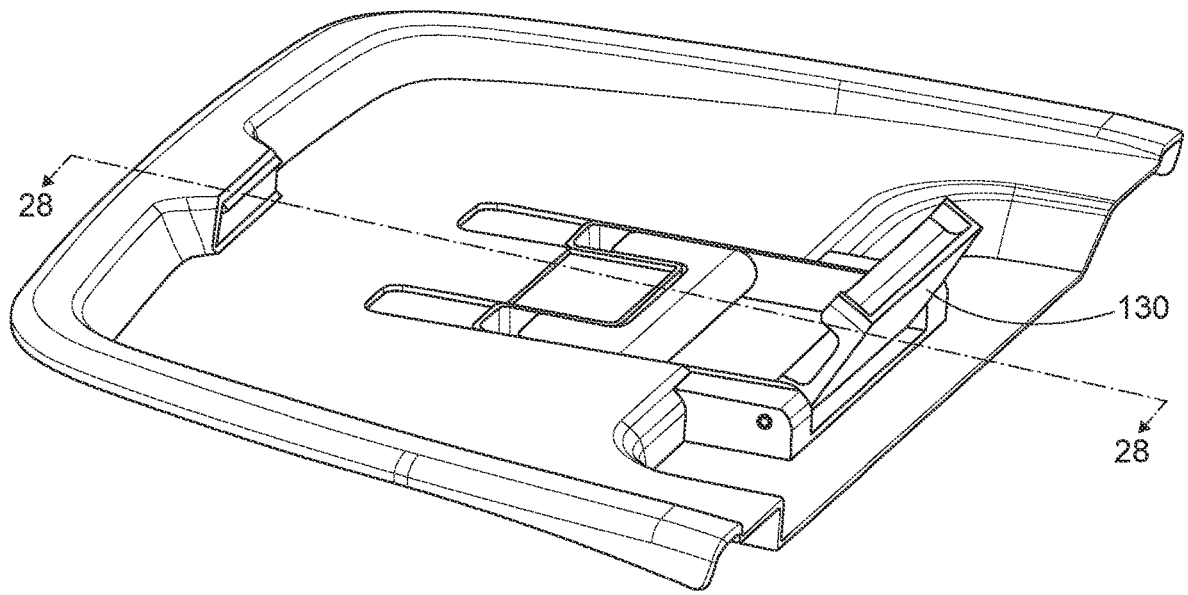
FIG. 27 is a bottom side perspective view of a personal electronic device holder independent of a passenger vehicle seatback, in accordance with an example of the disclosure.
Figure 28:
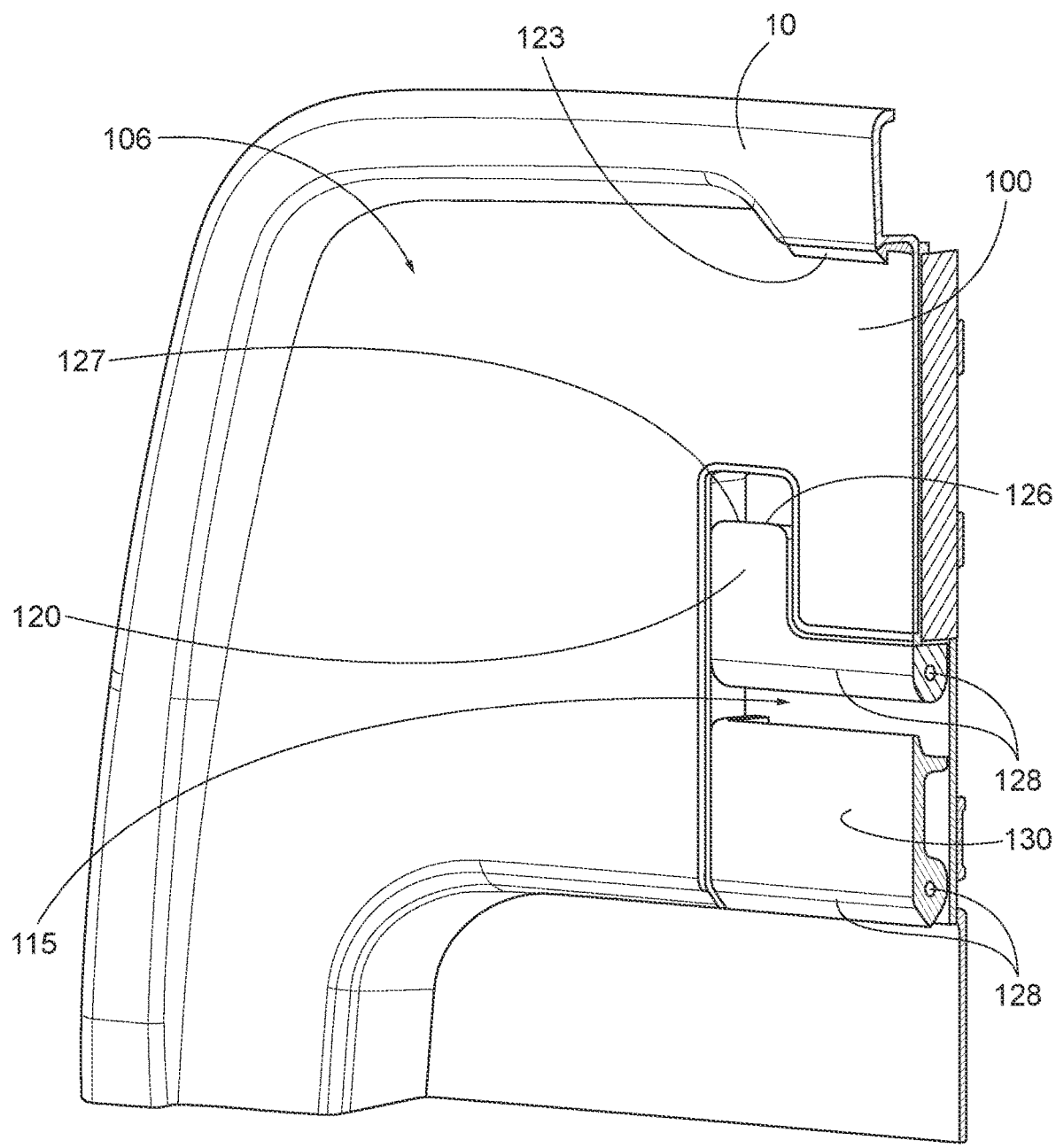
FIG. 28 is a cross-section of a personal electronic device holder taken at line 28-28 of FIG. 27, in accordance with an example of the disclosure.

FIG. 25 illustrates a small personal electronic device 600, such as a smart phone, seated within the small device clamp 120 of the clamp assembly 160. In this example, a top edge 126 of the small device clamp 120 drops into an outward position, from the device platform support surface 105. This is accomplished by pivoting it about a hinged bottom side 128. The hinged bottom side may be a spring loaded hinge assembly which maintains the small device clamp 120 within the void 115. The cross section of the device holder 10 of FIG. 28 further illustrates the hinged bottom sides 128 of the small device clamp 120 and the large device clamp 130, respectively. In some examples, as an alternative to a hinged assembly, the entire clamp may be maintained within the void by way of a tension spring and may be pulled from the void 115 for supporting a personal electronic device 600. When in use, a small device may be positioned above the top edge 126, which may further comprise a lip 127. The lip 127 may extend over an edge and/or onto the face of the small device in order to pin the device between the lip 127 and the front face 106 of the device platform 100. The small device is additionally supported by the retention tab 200 and/or one or more lips 202 of the retention tab. In the instance the size of the small device is greater than a distance $SD_{100}$ between the small device clamp 120 and the retention tab 200, but not large enough for the use with the large device clamp 130, the small device clamp 120 is adjustable in a direction of the height $H_{100}$ of the device platform 100. Specifically, the small device clamp 120 may slide in a direction of the height $H_{100}$ of the device platform 100 by way of a slide assembly 140, which moves between the seated position and the extended position. The small device clamp may slide relative the device platform 100 within the void 115 in the device platform 100. FIG. 26 illustrates a large device clamp 130 with features that operate in similar manner as the features of the small device clamp 120, as described above. FIG. 27 further illustrates a large device clamp 130 extended and with the slide assembly in the extended position but absent a personal electronic device.

In some examples, the personal electronic holder, or individual components thereof, may tilt relative to the backside of a passenger seat. By providing a tilting arrangement, a passenger may continue to enjoy his or her personal electronic device in the event another passenger, positioned in the seat having the backside on which the personal electronic device holder is provided, moves the seat such as when moving from a reclined position to an upright position or from an upright position to a reclined position. The entire personal electronic device holder may tilt relative to the backside of the seat. Additionally, or alternatively, the slide assembly, the small device clamp, the large device clamp, and/or the device platform support surface may tilt relative to the backside of the seat and/or other components of the personal electronic device holder.

It is appreciated herein that the operation and the features may vary between the device holders as described herein. It is contemplated herein, however, that these features are interchangeable between the examples described above. For example, a device holder having a slide assembly that raises may be used within a seat; a device holder having a slide assembly that lowers may be used with the articulating arm; a wireless charger may be provided in the device holder used with the articulating arm; etc. The various features for one example shall not be isolated to that example alone.

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A personal electronic device holder for a passenger vehicle comprising:
a device holder secured to a first end of an articulating arm wherein a second end of the articulating arm is secured to a passenger vehicle seat assembly by a mounting bracket;
the articulating arm further comprising an extension arm attached to the mounting bracket at a hinge assembly and attached to the device holder with one or more joints where the articulating arm moves the device holder between a raised position and a stowed position, wherein the hinge assembly comprises a passenger activated latch for releasing the articulating arm from a locked position in the raised position and in the stowed position;
the device holder further comprising a support surface and a bottom ledge for supporting a removable personal electronic device where the support surface comprises a grip aperture for securing a backside grip extending from a personal electronic device.

2. The personal electronic device holder of claim 1 wherein the grip aperture narrows from the top side of the support surface in a direction toward the bottom ledge.

3. The personal electronic device holder of claim 1 wherein the grip aperture narrows laterally across the support surface.

4. The personal electronic device holder of claim 1 wherein the extension arm comprises one or more cable apertures extending through a width of the extension arm.

5. The personal electronic device holder of claim 1 wherein the extension arm comprises a scalloped profile on one or more sidewalls of the extension arm.

6. The personal electronic device holder of claim 5 wherein the extension arm further comprises one or more cable apertures extending through a width of the extension arm and open through a sidewall different than the one or more sidewalls having the scalloped profile.

7. The personal electronic device holder of claim 1 wherein the stowed position is below a passenger vehicle seat of the passenger vehicle seat assembly.

8. The personal electronic device holder of claim 1 wherein the stowed position is below a passenger vehicle armrest of the passenger vehicle seat assembly.

9. The personal electronic device holder of claim 1 wherein the hinge assembly comprises a spring forcibly maintaining the passenger activated latch in the locked position except upon intervention by a passenger.

10. A personal electronic device holder for a passenger vehicle comprising:
a device holder secured to a first end of an articulating arm wherein a second end of the articulating arm is secured to a passenger vehicle seat assembly by a mounting bracket;
the articulating arm further comprising an extension arm attached to the mounting bracket at a hinge assembly and attached to the device holder with one or more joints where the articulating arm moves the device holder between a raised position and a stowed position, wherein the hinge assembly comprises a passenger activated latch for releasing the articulating arm from a locked position in the raised position and in the stowed position;
the device holder further comprising a support surface and a bottom ledge for supporting a removable personal electronic device where the support surface comprises a clamp assembly comprising a small device clamp and a large device clamp.

11. The personal electronic device holder of claim 10 wherein the small device clamp and the large device clamp are positioned within a void in the support surface.

12. The personal electronic device holder of claim 10 wherein the small device clamp comprises a spring loaded hinge assembly and extends from the support surface.

13. The personal electronic device holder of claim 12 wherein the small device clamp retracts to the support surface when the large device clamp is in use.

14. The personal electronic device holder of claim 10 wherein the clamp assembly comprises a slide assembly and a compression assembly.

15. The personal electronic device holder of claim 14 wherein the slide assembly and the compression assembly adjust to the size of a personal electronic device by moving the clamp assembly relative the support surface.

16. The personal electronic device holder of claim 14 wherein the slide assembly and the compression assembly secure a personal electronic device between the clamp assembly and the bottom ledge.

* * * * *